(12) United States Patent
Vu et al.

(10) Patent No.: US 8,259,530 B2
(45) Date of Patent: Sep. 4, 2012

(54) SYSTEM FOR GENERATING A BEAM OF ACOUSTIC ENERGY FROM A BOREHOLE, AND APPLICATIONS THEREOF

(75) Inventors: Cung Khac Vu, Houston, TX (US);
Dipen N. Sinha, Los Alamos, NM (US);
Cristian Pantea, Los Alamos, NM (US);
Kurt T. Nihei, Oakland, CA (US); Denis P. Schmitt, Katy, TX (US); Christopher Skelt, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 188 days.

(21) Appl. No.: 12/870,604

(22) Filed: Aug. 27, 2010

(65) Prior Publication Data
US 2010/0322029 A1  Dec. 23, 2010

Related U.S. Application Data

(63) Continuation of application No. 12/166,842, filed on Jul. 2, 2008, now Pat. No. 7,839,718.

(51) Int. Cl.
*G01V 1/00* (2006.01)
(52) U.S. Cl. .......................................................... 367/32
(58) Field of Classification Search .................... 367/32, 367/138; 181/104
See application file for complete search history.

(56) References Cited

U.S. PATENT DOCUMENTS

| | | | |
|---|---|---|---|
| 3,302,745 A | 2/1967 | Ikrath | |
| 3,872,421 A | 3/1975 | Rogers et al. | |
| 3,974,476 A | 8/1976 | Cowles | |
| 4,382,290 A | 5/1983 | Havira | |
| 4,757,873 A | 7/1988 | Linyaev et al. | |
| 4,805,873 A | 2/1989 | Mouton | |
| 5,144,590 A | 9/1992 | Chon | |

(Continued)

FOREIGN PATENT DOCUMENTS
EP 1122558 A1 8/2001
(Continued)

OTHER PUBLICATIONS

International Preliminary Report on Patentability for PCT International Patent Application No. PCT/US2009/047934, mailed on Jan. 13, 2011.

(Continued)

*Primary Examiner* — Jack W Keith
*Assistant Examiner* — Krystine Breier
(74) *Attorney, Agent, or Firm* — Pillsbury Winthrop Shaw Pittman, LLP

(57) ABSTRACT

In some aspects of the invention, a device, positioned within a well bore, configured to generate and direct an acoustic beam into a rock formation around a borehole is disclosed. The device comprises a source configured to generate a first signal at a first frequency and a second signal at a second frequency; a transducer configured to receive the generated first and the second signals and produce acoustic waves at the first frequency and the second frequency; and a non-linear material, coupled to the transducer, configured to generate a collimated beam with a frequency equal to the difference between the first frequency and the second frequency by a non-linear mixing process, wherein the non-linear material includes one or more of a mixture of liquids, a solid, a granular material, embedded microspheres, or an emulsion.

24 Claims, 22 Drawing Sheets

U.S. PATENT DOCUMENTS

| | | | |
|---|---|---|---|
| 5,521,882 | A | 5/1996 | D'Angelo et al. |
| 5,719,823 | A * | 2/1998 | Earp .............................. 367/92 |
| 6,009,043 | A | 12/1999 | Chon et al. |
| 6,175,536 | B1 | 1/2001 | Khan |
| 6,216,540 | B1 | 4/2001 | Nelson et al. |
| 6,440,075 | B1 | 8/2002 | Averkiou |
| 6,704,247 | B1 | 3/2004 | Ruffa |
| 7,301,852 | B2 | 11/2007 | Leggett, III et al. |
| 7,463,551 | B2 | 12/2008 | Leggett, III et al. |
| 2005/0036403 | A1 | 2/2005 | Leggett, III et al. |
| 2010/0002540 | A1 | 1/2010 | Vu et al. |

FOREIGN PATENT DOCUMENTS

| | | |
|---|---|---|
| GB | 2168568 A | 6/1986 |
| GB | 2404983 A | 2/2005 |
| SU | 913303 A | 3/1982 |

OTHER PUBLICATIONS

International Preliminary Report on Patentability for PCT International Patent Application No. PCT/US2009/047184, mailed on Dec. 14, 2010.

International Search Report and Written Opinion for PCT International Patent Application No. PCT/US2009/047934 mailed Dec. 1, 2009.

International Search Report and Written Opinion for PCT International Patent Application No. PCT/US2009/047184, mailed Dec. 21, 2009.

Westervelt, "Parametric Acoustic Array", The Journal of the Acoustical Society of America, vol. 35, No. 4, Apr. 1963, pp. 535-537.

Johnson et al., "Nonlinear Generation of Elastic Waves in Crystalline Rock", Journal of Geophysical Research, vol. 92, No. B5, Apr. 10, 1987, pp. 3597-3602.

Ostrovsky et al., "Dynamic Nonlinear Elasticity in Geomaterials", Rivista del Nuovo Cimento, vol. 24, No. 7., 2001.

Johnson et al., "Nonlinear Generation of Elastic Waves in Granite and Sandstone: Continuous Wave and Travel Time Observations", Journal of Geophysical Research, vol. 94, No. B12, Dec. 10, 1989, pp. 17,729-17,733.

Jones et al., "Interaction of Elastic Waves in an Isotropic Solid", The Journal of the Acoustical Society of America, vol. 35, No. 1, Jan. 1963, pp. 5-10.

Rollins et al., "Ultrasonic Study of Three-Phonon Interactions. II. Experimental Results", Physical Review, vol. 136, No. 3A, Nov. 1964, pp. 597-601.

Korneev et al., "Nonlinear Interaction of Plane Elastic Waves", Lawrence Berkeley National Laboratory Report LBNL-41914, 1998.

Tserkovnyak et al., "Nonlinear tube waves in permeable formations: Difference frequency generation", Journal of the Acoustical Society of America, Jul. 1, 2004, vol. 116, Issue 1, pp. 209-216.

Singapore Office Action for Singapore Patent Application No. 201009640-2, mailed Dec. 2, 2011.

PCT International Search Report an Written Opinion for PCT International Patent Application No. PCT/US2011/035608, mailed Dec. 22, 2011.

PCT International Search Report an Written Opinion for PCT International Patent Application No. PCT/US2011/035595, mailed Dec. 27, 2011.

PCT International Search Report an Written Opinion for PCT International Patent Application No. PCT/US2011/035358, mailed Dec. 29, 2011.

* cited by examiner

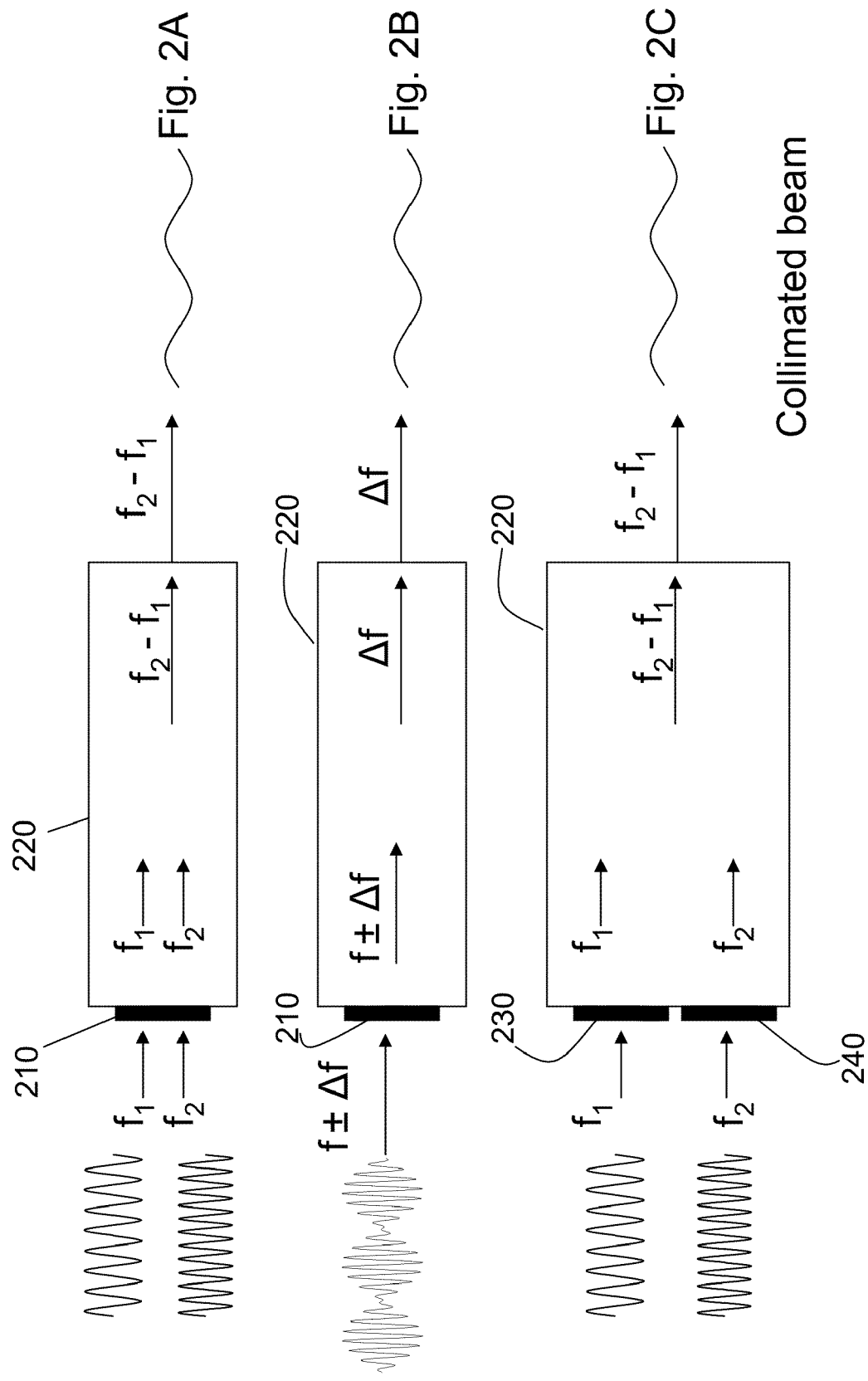

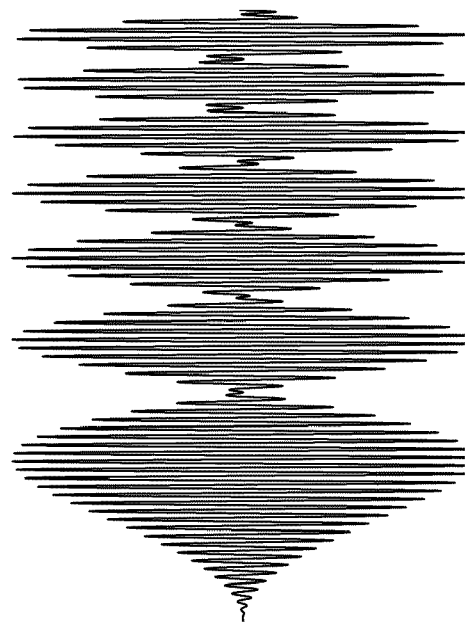
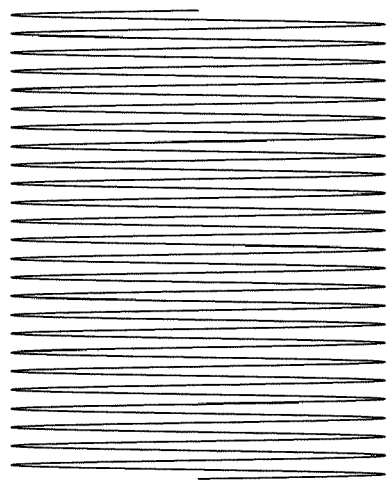
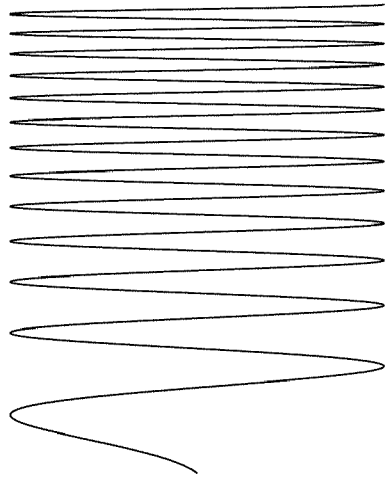
Fig. 5A Single frequency burst
Frequency chirp (broadband)
Fig. 5B Combined signal to transducer

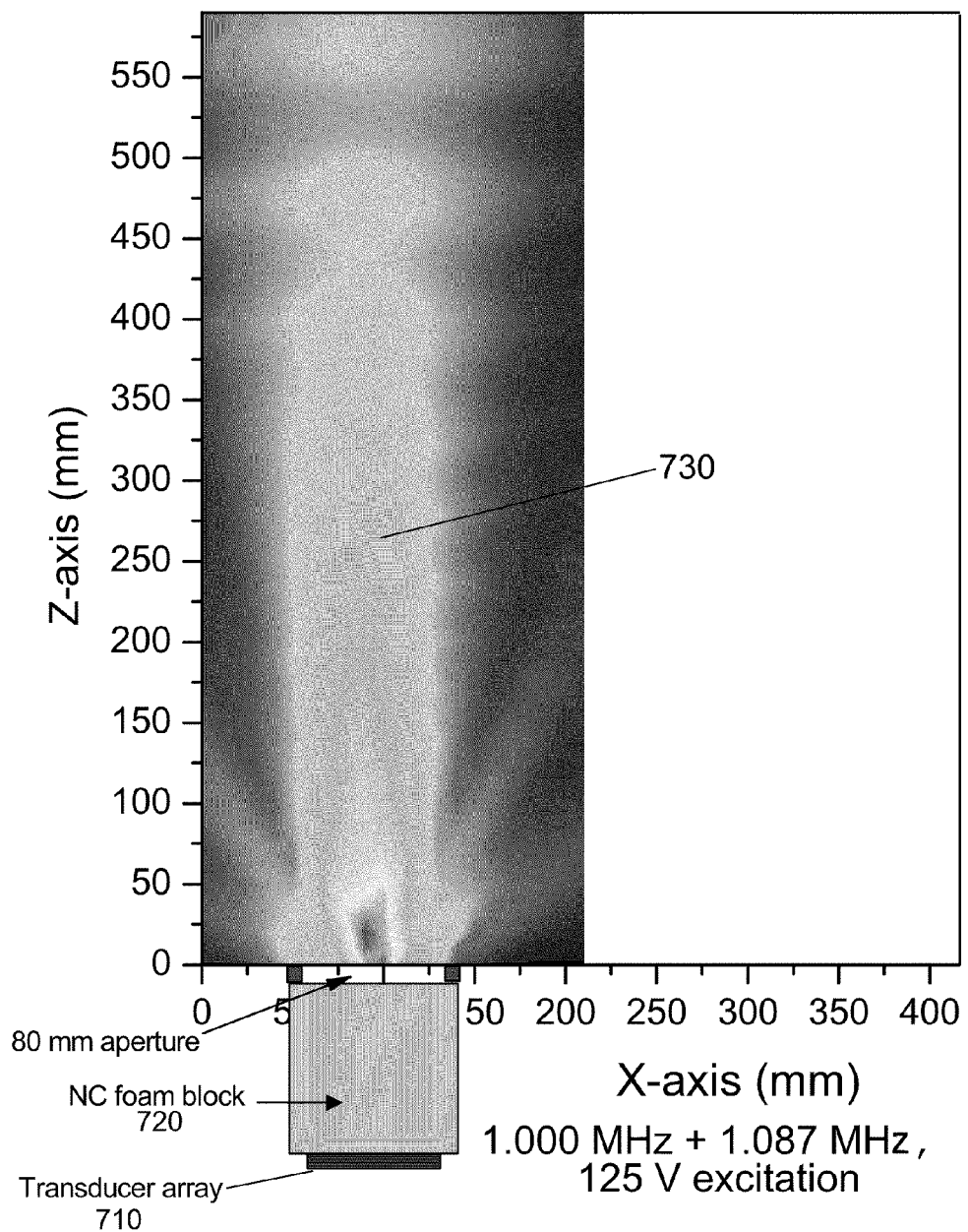

Difference signal

FFT of difference signal

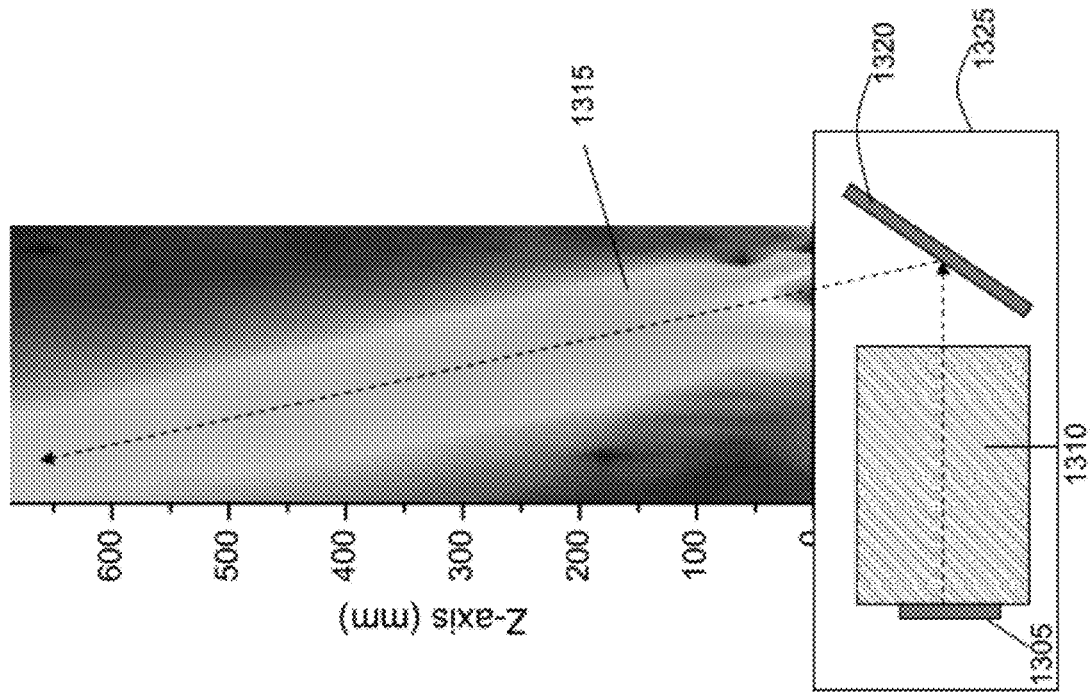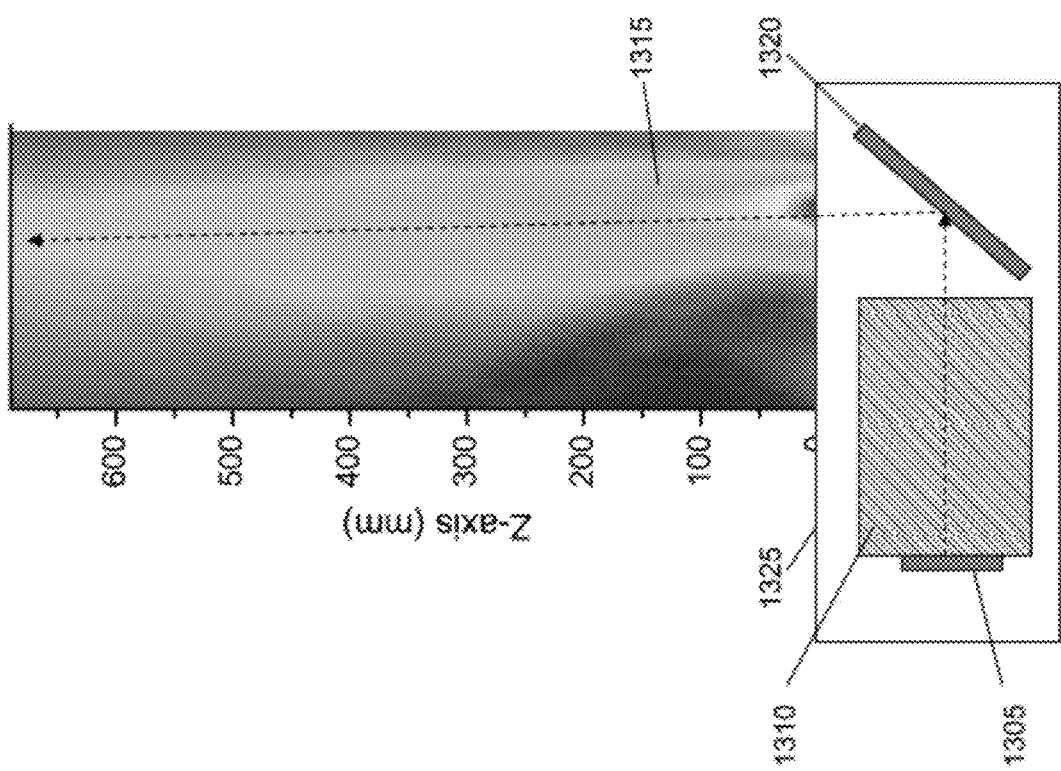

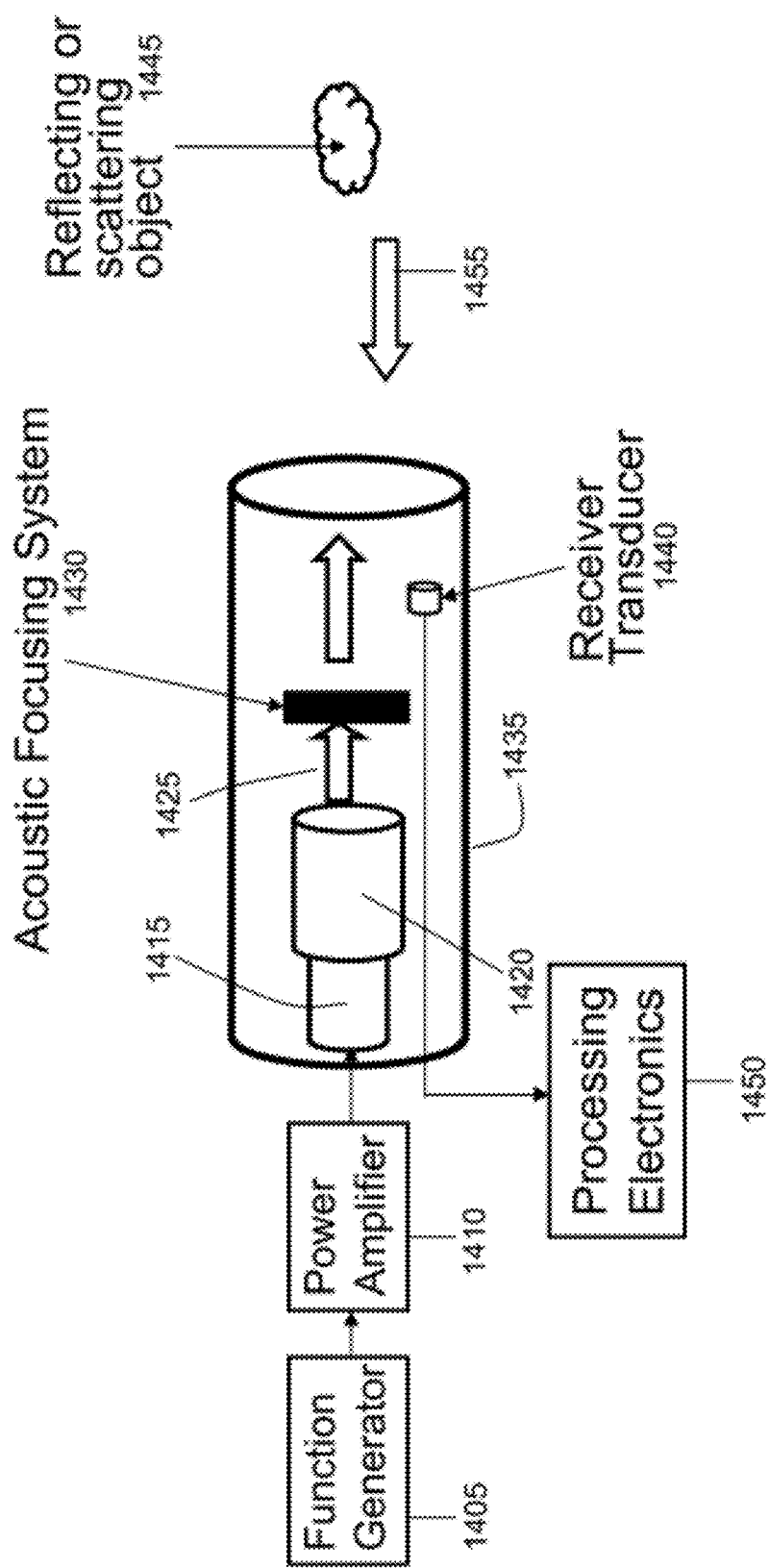

SYSTEM FOR GENERATING A BEAM OF ACOUSTIC ENERGY FROM A BOREHOLE, AND APPLICATIONS THEREOF

CROSS REFERENCE TO RELATED APPLICATIONS

This application is a continuation of U.S. application Ser. No. 12/166,842, filed Jul. 2, 2008, the contents of which are incorporated herein by reference.

GOVERNMENT RIGHTS

This invention was made with Government support under Cooperative Research and Development Agreement (CRADA) Contract Number DE-AC52-06NA25396 awarded by the United States Department of Energy. The Government may have certain rights in this invention.

FIELD

The present invention relates generally to acoustic interrogation of rock formations around a borehole and more particularly to using the combination of an acoustic source including a single transducer or an array of transducers in the wellbore coupled to a non-linear material for producing an acoustic beam as a probing tool from a borehole to interrogate the properties of rock formations and materials surrounding the borehole.

BACKGROUND

Acoustic interrogation of subsurface features tends to be limited by the size and power of practical sources, and in practice, the output of downhole acoustic transducers is limited by the power transmission capabilities of the wire line cable. High frequency signals have a relatively short penetration distance, while low frequency signals generally require large sources, clamped to the borehole wall, to maximize energy transfer to the formation and minimize unwanted signals within the well bore. It is difficult to generate a collimated acoustic beam signal in the 10 kHz-100 kHz range from the borehole to probe the rock formation surrounding a borehole with conventional low-frequency transducers. Conventional low-frequency acoustic sources in this frequency range have low bandwidth, less than 30% of the center frequency, and very large beam spread that depends on the frequency, such that as the frequency decreases, the beam spread increases. Sharp focus requires a number of conditions to be satisfied, including a long source array, uniform coupling of all the transducers to the rock formation around the borehole and knowledge of the acoustic velocities of the rock formation. In the borehole environment, these conditions are not often achievable because of underlying physics constraints, engineering feasibility or operating conditions.

Acoustic beam sources based on a non-linear mixing of acoustic waves have been proposed for general applications in fluid media, such as underwater sonar, since the 1950s. For subsurface applications, U.S. Pat. No. 3,974,476 to Cowles discloses an acoustic source for borehole surveys. The disclosure of Cowles describes an acoustic source generation device that is not physically possible in a borehole of the typical size used by the oil and gas industry. For example, the generation of a 1 kHz frequency beam by mixing two frequencies around 5 MHz in a borehole environment violates basic physical principles. A typical wireline logging tool has a diameter of 3 ⅝ inch (9.2 cm), thus the wavelength of a 1 kHz wave in a typical fluid of 1500 m/s will be 1.5 m. This represents close to 10 times the borehole diameter. This 1 kHz acoustic wave cannot stay collimated without violating the basic uncertainty principle of wave diffraction physics. Moreover, the mixing of 5 MHz frequencies to generate a 1 kHz wave represents a step-down frequency ratio of 5000:1, which has not been demonstrated to be achievable in practice. The dimensions of the Cowles proposed tool length of 4.5 m is too long and impractical to fit in present day logging strings.

SUMMARY

In accordance with an aspect of the invention, a device, positioned within a well bore, configured to generate and direct an acoustic beam into a rock formation around a borehole, is disclosed. The device comprises a source configured to generate a first signal at a first frequency and a second signal at a second frequency; a transducer configured to receive the generated first and the second signals and produce acoustic waves at the first frequency and the second frequency; and a non-linear material, coupled to the transducer, configured to generate a collimated beam with a frequency equal to the difference between the first frequency and the second frequency by a non-linear mixing process, wherein the non-linear material includes one or more of a mixture of liquids, a solid, a granular material, embedded microspheres, or an emulsion.

In accordance with an aspect of the invention, a method of generating a beam of acoustic energy in a rock formation penetrated by a borehole is disclosed. The method comprises generating a first acoustic wave at a first frequency; generating a second acoustic wave at a second frequency different than the first frequency, wherein the first acoustic wave and second acoustic wave are generated by a transducer located within the borehole; transmitting the first and the second acoustic waves into an acoustically non-linear medium to produce a collimated beam by a non-linear mixing process, wherein the collimated beam propagates through the non-linear medium in a same direction as an initial direction of the first and second acoustic waves and has a frequency equal to a difference of the first and the second acoustic waves, wherein the non-linear material includes one or more of a mixture of liquids, a solid, a granular material, embedded microspheres, or an emulsion; and directing the collimated beam in a given direction away from the wellbore into the rock formation.

In accordance with an aspect of the invention, a method of generating a beam of acoustic energy in a rock formation penetrated by a borehole is disclosed. The method comprises generating a first acoustic wave at a first frequency; generating a second acoustic wave at a second frequency different than the first frequency, wherein the first acoustic wave and second acoustic wave are generated by a transducer located within the borehole; transmitting the first and the second acoustic waves into an acoustically non-linear medium to produce a collimated beam by a non-linear mixing process, wherein the non-linear medium includes one or more of a mixture of liquids, a solid, a granular material, embedded microspheres, or an emulsion; directing the collimated beam in a given direction into the rock formation; and receiving the collimated beam at one or more receivers after it has reflected or backscattered from an inhomogeneity in the formation, materials near the borehole, or both.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 2a, 2b and 2c show different modes of generating a difference frequency through a non-linear process in accordance with aspects of the invention.

FIGS. 5a and 5b show an aspect of the invention where the collimated beam is produced by a chirp burst.

FIGS. 7a, 7b and 7c show an aspect of the invention where the collimated beam produced by the non-linear mixing process using a CNC foam block.

FIGS. 13a and 13b show an aspect of the invention where the collimated beam after steering with an acoustical mirror exits the metal pipe casing.

FIG. 14 shows an aspect of the invention where the device is used with or without an acoustic focusing system to look straight down a borehole.

DETAILED DESCRIPTION

Figure 1:
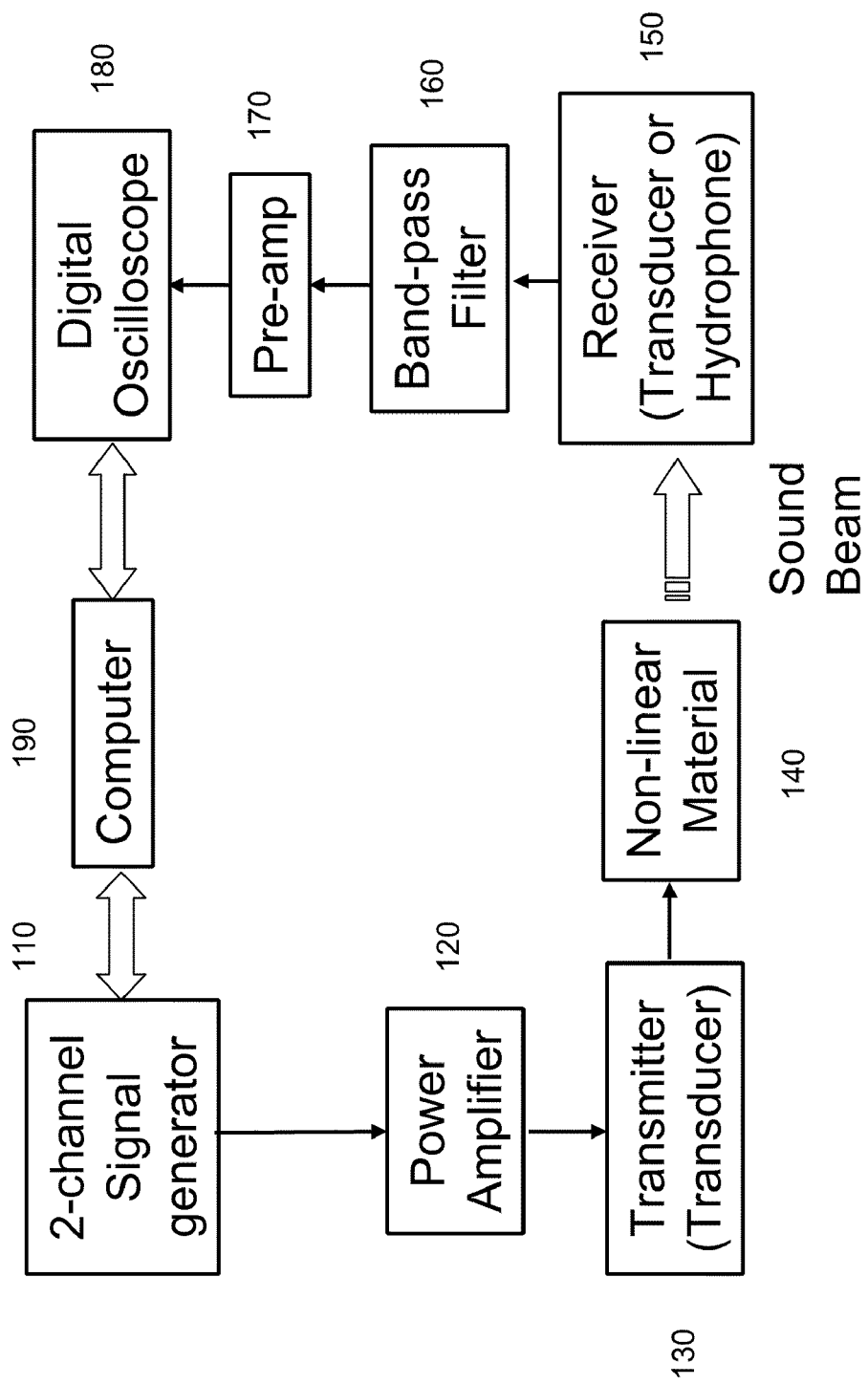
FIG. 1 shows a generalized diagram of the device for producing the collimated beam in accordance with an aspect of the invention.

FIG. 1 shows a generalized diagram of the device for producing the collimated beam in accordance with an aspect of the invention. In some embodiments, one or more sources 110 are used to produce a first signal at a first frequency and a second signal at a second frequency. By way of a non-limiting example, the signals can be produced by a 2-channel signal generator. Similar signal or function generators may be used. The signals from the sources are received by one or more signal amplifiers 120 and are transmitted to one or more transducers 130 that are used to generate acoustic waves at the first and the second frequencies. Piezoelectric transducers are one type suitable for this application. If more than one transducer is use, they can be arranged in an array configuration. By way of non-limiting examples, the array configuration can be linear, circular, a filled circle or a square array. The transducers within the array are divided into two groups, wherein the first group of transducers is driven by a source at the first frequency and the second group of transducers is driven by the source or by a different source at the second frequency. In some aspects of the invention, the source configured to generate the first frequency and the source configured to generate the second frequency drive all the transducers simultaneously. By way of a non-limiting example, the first frequency is 1.036 MHz and the second frequency is 0.953 MHz. In some embodiments, the first frequency and the second frequency is between 300 kHz and 2 MHz.

The acoustic signal is transmitted in a non-linear material 140 to generate a collimated acoustic beam by way of a non-linear mixing process. The non-linear material can be a liquid, a mixture of liquids, a solid, a granular material embedded in a solid casing, embedded microspheres, or an emulsion. By way of a non-limiting example of such a non-linear material is 310M ceramic foam sold by Cotronics of Brooklyn, N.Y., which is composed of over 99% pure fused silica ceramic and provides low thermal expansion and conductivity, high thermal shock resistance and high thermal reflectance. 310M has a density of 0.80 g/cm$^3$ and a speed of sound of 1060 m/s. Another non-limiting example of the non-linear material is a urethane foam board material. This type of foam is typically used for Computer Numerically Controlled (hereinafter, "CNC") machining. The CNC foam has a density of 0.48 g/cm$^3$ and a speed of sound of 1200 m/s. Depending on the operating conditions in the borehole, other non-linear materials can be used as a non-linear mixing medium with suitable low sound velocity, high non-linear coupling, absorption length, shock wave length, temperature and pressure operating ranges, as well as, other requirements required by operability specifications. Moreover, the length of the non-linear material can be very compact and can range from between 5 cm to 2 meters depending on the type of materials being used.

This non-linear behavior may be characterized through the analysis of the properties of P-waves resulting from the non-linear mixing phenomenon in which two incident waves at two different frequencies, $f_1$ and $f_2$, mix to generate third frequency components at the harmonics and intermodulation frequencies $f_2-f_1$, $f_2+f_1$, $2f_1$ and $2f_2$, etc. In an aspect of the invention, the non-linear collinear mixing phenomenon is designed to occur in the non-linear material inside the wellbore. In general, only the resulting third wave of difference frequency $f_2-f_1$ is of interest to this application. The higher frequencies only propagate a short distance and tend to be absorbed in the non-linear material itself. In some embodiments, the third wave or collimated beam has a frequency between 10 kHz and 100 kHz.

The collimated beam is received by one or more receivers 150 located in either the same borehole where the collimated beam is produced or another borehole. For example, the receivers can be an acoustic transducer, a hydrophone or another type of receiver suitable for the frequency range of interest. The received signal can be filtered by band-pass filter 160 and amplified by a pre-amplifier 170. The filtered and amplified signal can be displayed on a digitizer, such as a digital oscilloscope 180. The digital oscilloscope 180 can be controlled by a computer 190. The computer 190 can also be used to control the signal generator 110.

FIGS. 2a, 2b and 2c show different modes of generating the difference frequency in a non-linear material. The notations f, $f_1$ and $f_2$ refer to high frequency signals. The signals received from the source 110 and the power amplifier 120 by a transducer 210, enter a non-linear material 220. After a certain propagation length, the difference frequency is generated in the non-linear material 220. FIG. 2a shows the generation of a difference frequency $f_2-f_1$ by applying two different signals having two different frequencies $f_1$ and $f_2$ to the same transducer 210. FIG. 2b shows the generation of a difference frequency $\Delta f$ by applying an amplitude modulated signal of frequency f and a modulation of $\Delta f$. FIG. 2c shows the generation of a difference frequency $f_2-f_1$ by applying two different signals having a first frequency $f_1$ to a first transducer 230 and a second frequency $f_2$ to a second transducer 240. The high frequency beams overlap in the non-linear material and produce the difference frequency $f_2-f_1$.

In accordance with the above, and by way of a non-limiting example, the first frequency is 1.036 MHz and the second frequency is 0.953 MHz. The collimated acoustic beam generated by the interaction with the non-linear material will have a frequency equal to the difference between the first frequency and the second frequency. In this example, the collimated acoustic beam has narrow frequency band with a clear dominant frequency of 83 kHz. In some embodiments, the collimated acoustic beam can have a relatively broad frequency range, wherein the first frequency is a single, narrow band frequency and the second frequency is swept across a broader range of frequencies. The first frequency may also be swept across a broad range of frequencies as well as the second frequency. In either case, the first frequency, the second frequency, or both can be a coded signal or an uncoded chirp. One benefit of coding the signal is signal to noise ratio improvement.

In some embodiments, the collimated beam is encoded with a time-varying code, which can be introduced into either the first or the second signal, or both. The time-varying code may include one or more of a variation in amplitude, a variation in frequency, and/or a variation in phase of the first, the second, or both the first and the second signals. The received time-varying code of the collimated beam can be used to measure a time-of-flight of the beam. Additionally, in some embodiments, the collimated beam can be broad-band if one of the primary frequencies is swept through a range of frequencies while the other is fixed. Thus, the resulting third beam $f_2-f_1$ will be swept across a wide frequency range.

FIG. 3 shows results of laboratory measurements in relation to theoretical predictions based on non-linear mixing and wave propagation theory. Acoustic waves are distorted by the nonlinear characteristics of the medium through which they propagate. The nonlinear propagation of acoustic waves can be modeled via the Khokhov-Zabolotskaya-Kuznetsov (KZK) equation, which can be solved by a finite difference approximate scheme. The KZK equation explains various nonlinear characteristics such as diffraction of sound pressure, attenuation of sound pressure (i.e., absorption), and generation of a harmonic frequency component (i.e., non-linearity), and models the shape of an acoustic signal as a sound pressure given such parameters as initial transmission sound pressure, transducer diameter and transducer array geometry, propagated distance, and medium. The KZK non-linear parabolic equation takes into account the combined effects of diffraction, absorption, and non-linearity in directive sound beams. The KZK equation for an axisymmetric sound beam that propagates in the positive z direction can be expressed in terms of an acoustic pressure p as follows:

$$\frac{\partial^2 p}{\partial z \partial t'} = \frac{c_0}{2}\left(\frac{\partial^2 p}{\partial r^2} + \frac{1}{r}\frac{\partial p}{\partial r}\right) + \frac{D}{2c_0^3}\frac{\partial^3 p}{\partial t'^3} + \frac{\beta}{2\rho_0 c_0^3}\frac{\partial^2 p^2}{\partial t'^2} \quad (1)$$

where $t'=t-z/c_0$ is a retarded time variable, t is time, $c_0$ is a small signal sound speed, $r=(x^2+y^2)^{1/2}$ is a radial distance from the z axis (i.e., from the center of the beam), $\partial^2/\partial r^2+(1/r)\partial/\partial r$ is the transverse Laplacian operator, and $\rho_0$ is the ambient density of the fluid. Furthermore, $D=\rho_0^{-1}[(\zeta+4\eta/3)+\kappa(1/c_v-1/c_p)]$ is the sound diffusivity of a thermoviscous medium, where $\zeta$ is the bulk viscosity, $\eta$ the shear viscosity, $\kappa$ the thermal conductivity, and $c_v$ and $c_p$ the specific heats at constant volume and pressure, respectively. The coefficient of non-linearity is defined by $\beta=1+B/2A$, where B/A is the parameter of non-linearity of the medium. The first term on the right-hand side of equation (1) accounts for diffraction (focusing) effects, the second term for absorption, and the third term for non-linearity of the attenuating medium. Further details on the form and use of the KZK model may be found in Y.-S. Lee, "Numerical solution of the KZK equation for pulsed finite amplitude sound beams in thermoviscous fluids," Ph.D. Dissertation, The University of Texas at Austin (1993), which is hereby incorporated by reference in its entirety.

Figure 3A:
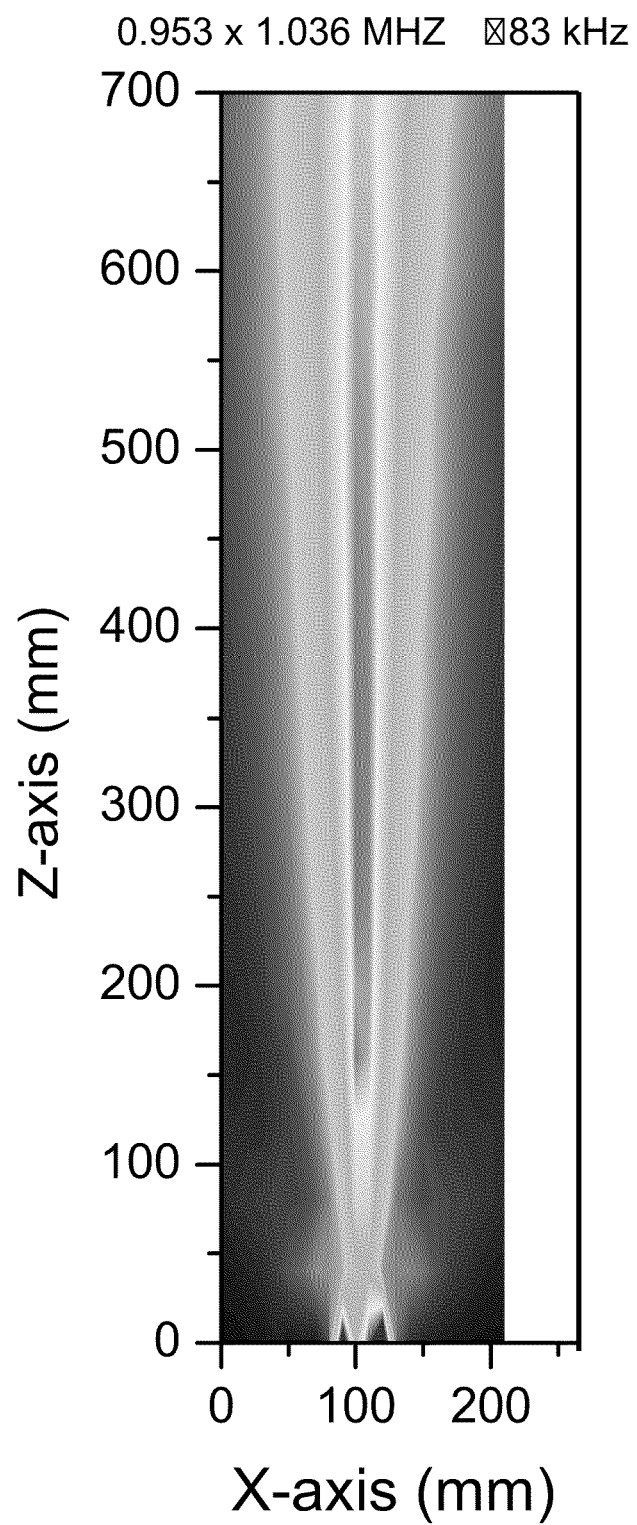
FIGS. 3a and 3b show comparisons of experimental results and theoretical predictions of the non-linear mixing in water in terms of the amplitude of the collimated beam and axial (z-direction) position.
Figure 3B:
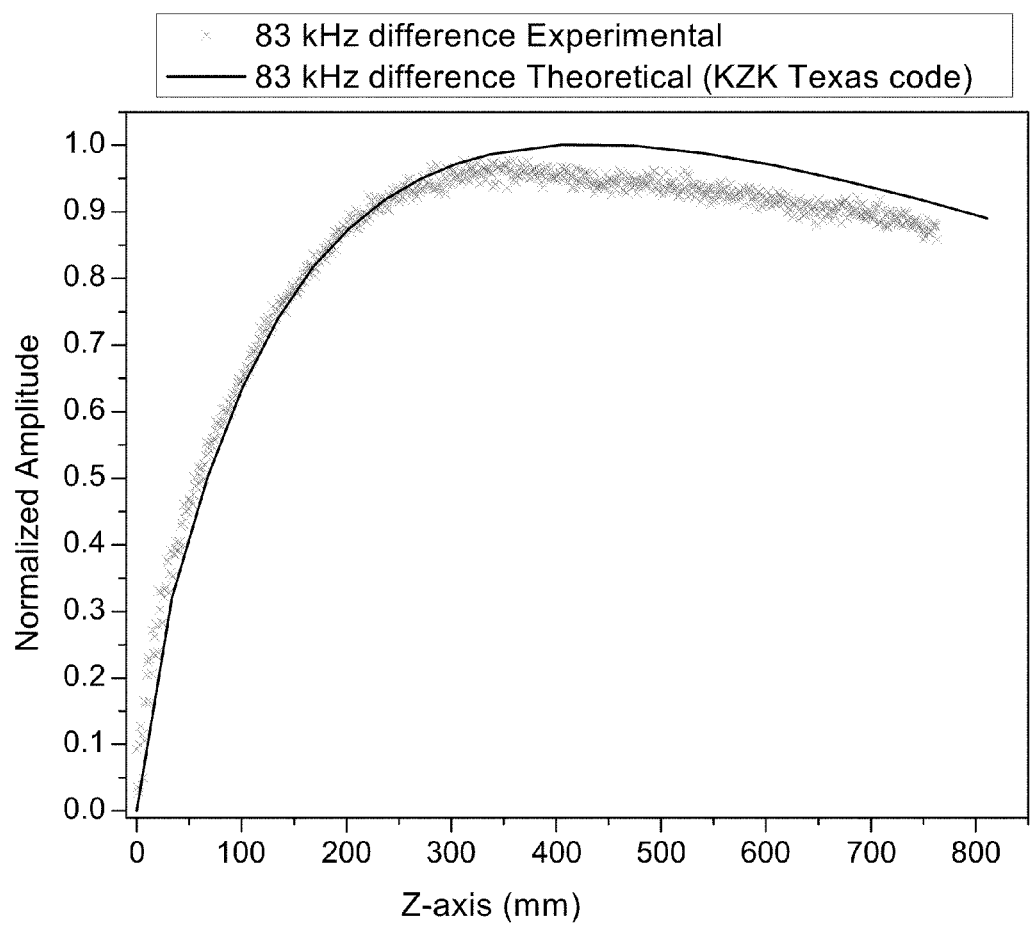

For the laboratory measurement, the transducer was excited at 0.953 MHz and 1.036 MHz leading to a collimated beam having a frequency equal to the difference of 1.036 MHz–0.953 MHz=83 kHz. The collimated beam was produced by the non-linear mixing process using water as the non-linear material. FIG. 3a shows the amplitude of the generated beam for a range of z and x positions of a hydrophone receiver. FIG. 3b shows a plot of the observed axial intensity profile, in good agreement with theory.

Figure 4A:
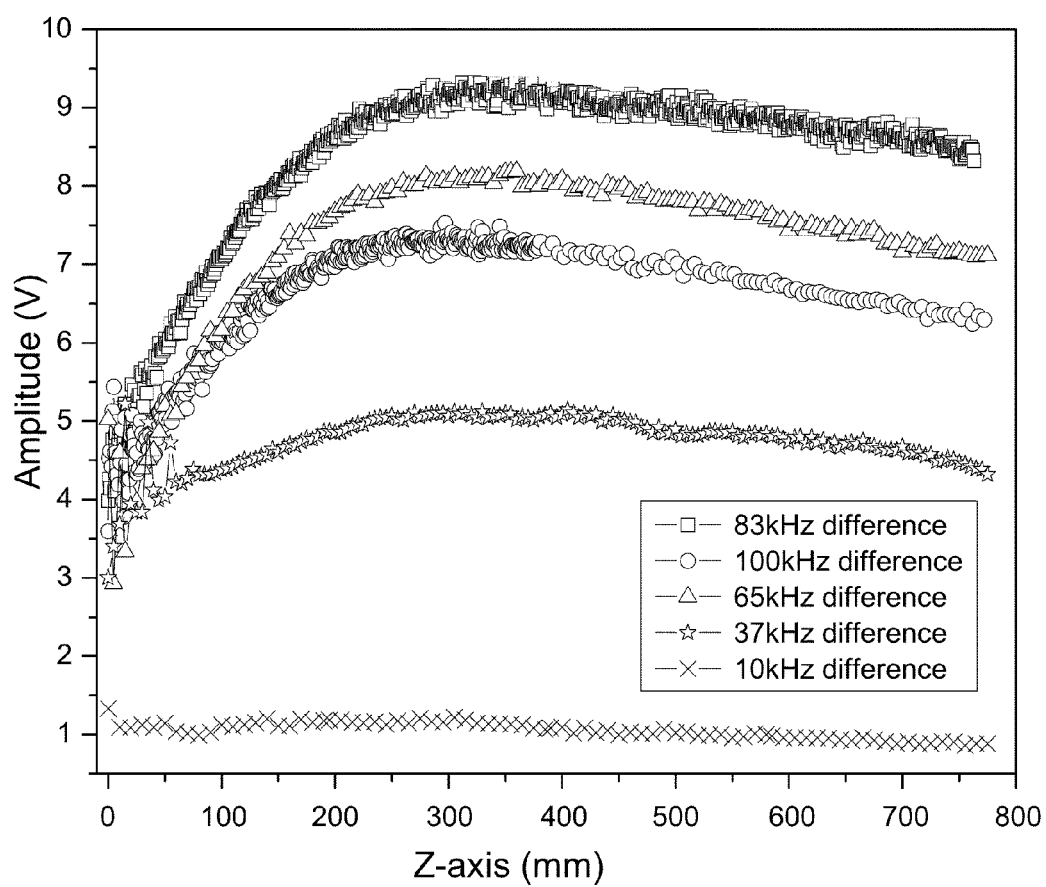
FIGS. 4a and 4b show experimental results of the non-linear mixing in water as the non-linear medium in terms of the amplitude of the collimated beam at various excited frequencies and axial (z-direction) and lateral (x-direction) positions.
Figure 4B:
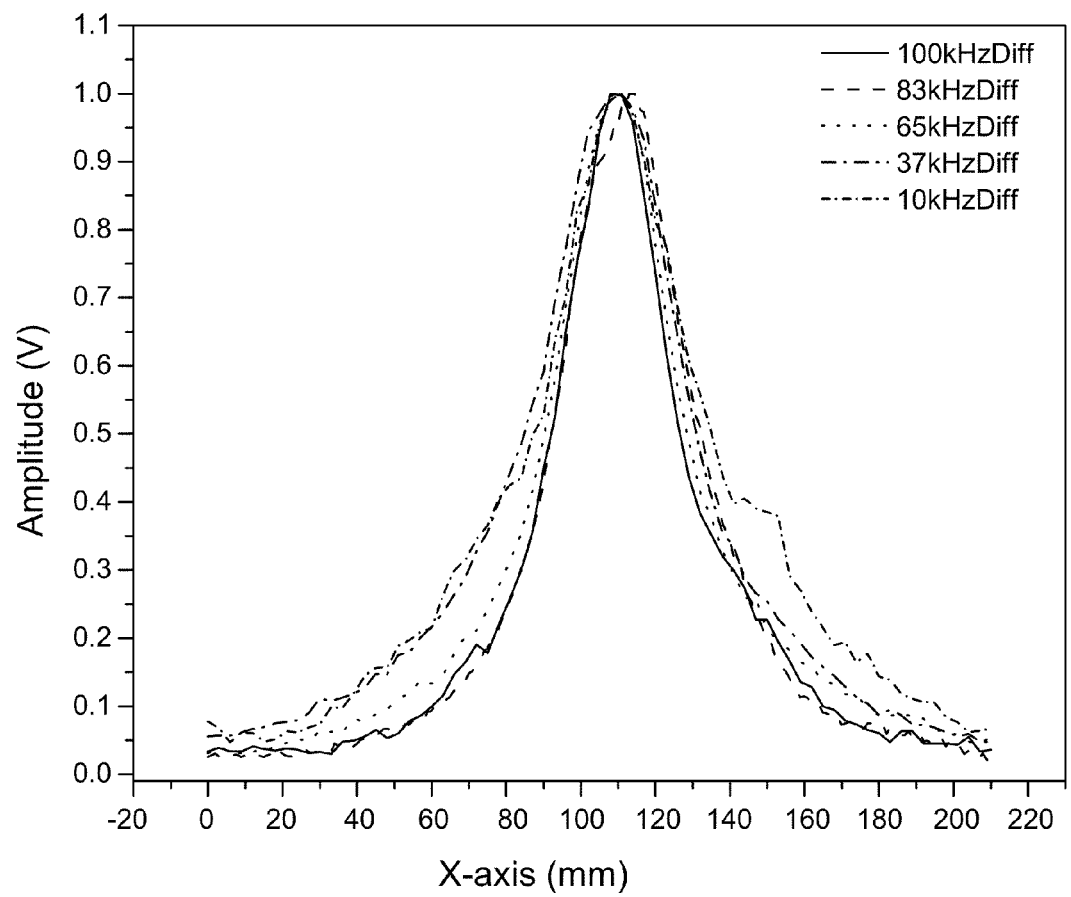

FIG. 4a shows the results obtained by exciting the transducers at a variety of different frequencies, and thus producing the collimated beam having a different frequency. The results are shown as a plot of amplitude as measured by a voltage, versus a position along the z-axis direction measured in millimeters. In this laboratory test, collimated beams were produced having at frequencies of 10 kHz, 37 kHz, 65 kHz, 83 kHz and 100 kHz. As can be seen in the figure, the collimated beams have similar beam profiles along the z-axis direction. FIG. 4b shows the beam cross section at a distance of 110 mm from the emitter. In this figure, the amplitude of the beam as represented by a voltage is plotted against the x-axis direction as measured in millimeters. The results indicate that the collimated beam at a variety of frequencies shows similar highly concentrated beam cross sections in the x-direction, unlike waves of the same frequency that would be more spread out in the x-direction.

As discussed above, the collimated beam can have a relatively narrow frequency range, wherein the one or more transducers are excited by a source producing a particular frequency, or the collimated beam can have a relatively broad frequency range. An example of the production of the collimated beam having a relatively broad frequency range is shown in FIGS. 5a and 5b. By way of a non-limiting example, FIG. 5a shows a chirp signal of finite duration that has a frequency ranging from 900 kHz to 1 MHz and a burst of a frequency of 1 MHz. FIG. 5b shows the resultant burst plotted as an amplitude as represented in voltage versus time in microseconds.

Figure 6A:
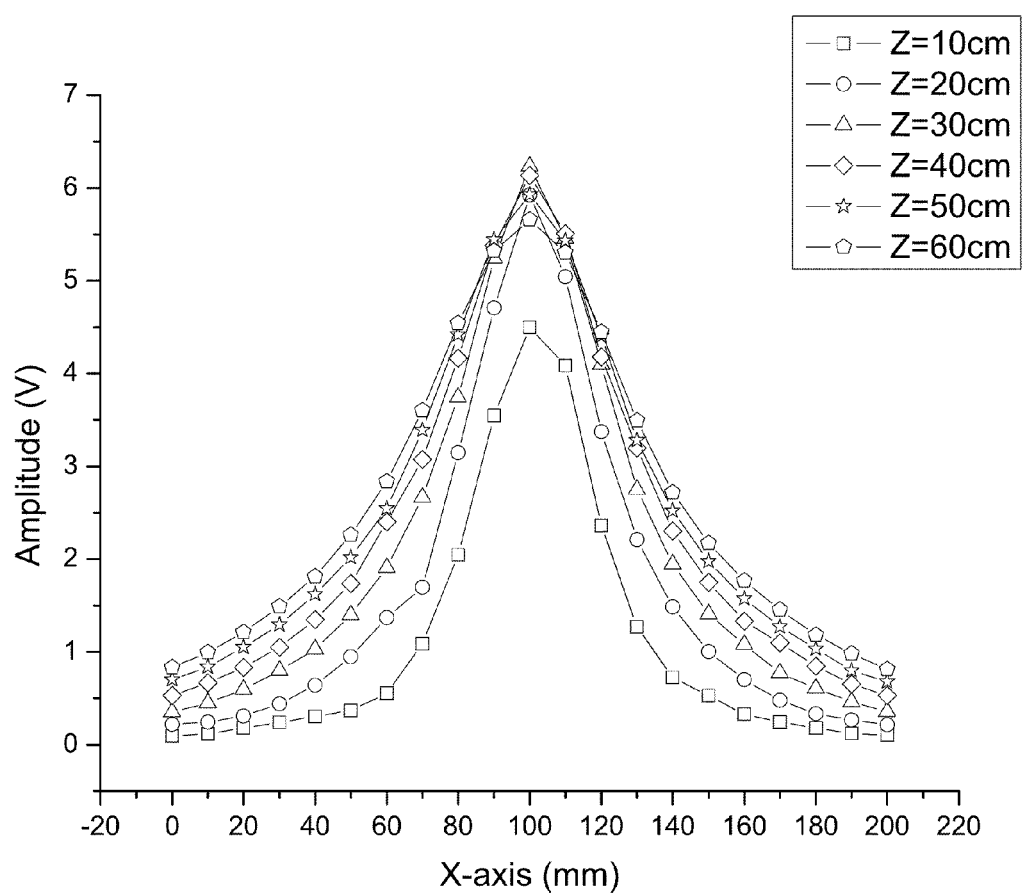
FIGS. 6a, 6b and 6c show an aspect of the invention where the collimated beam is produced by a chirp burst.
Figure 6B:
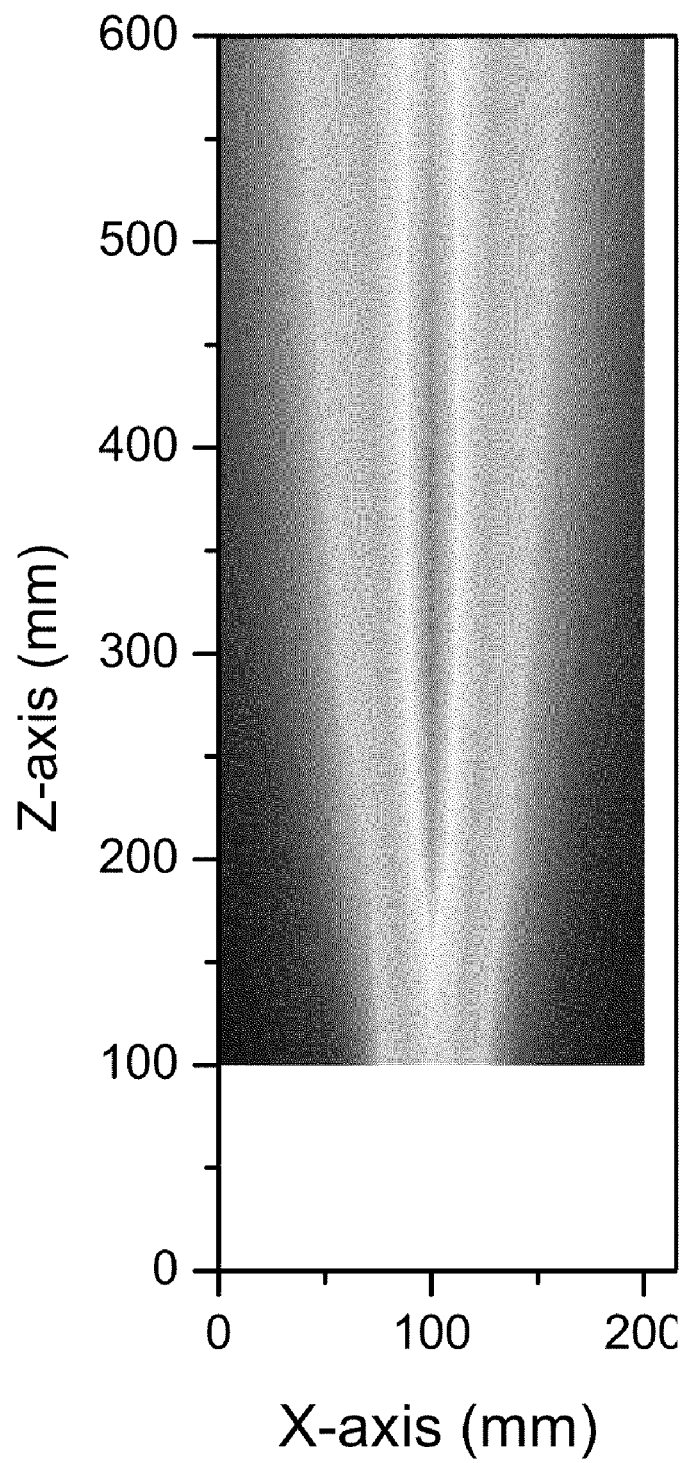
Figure 6C:
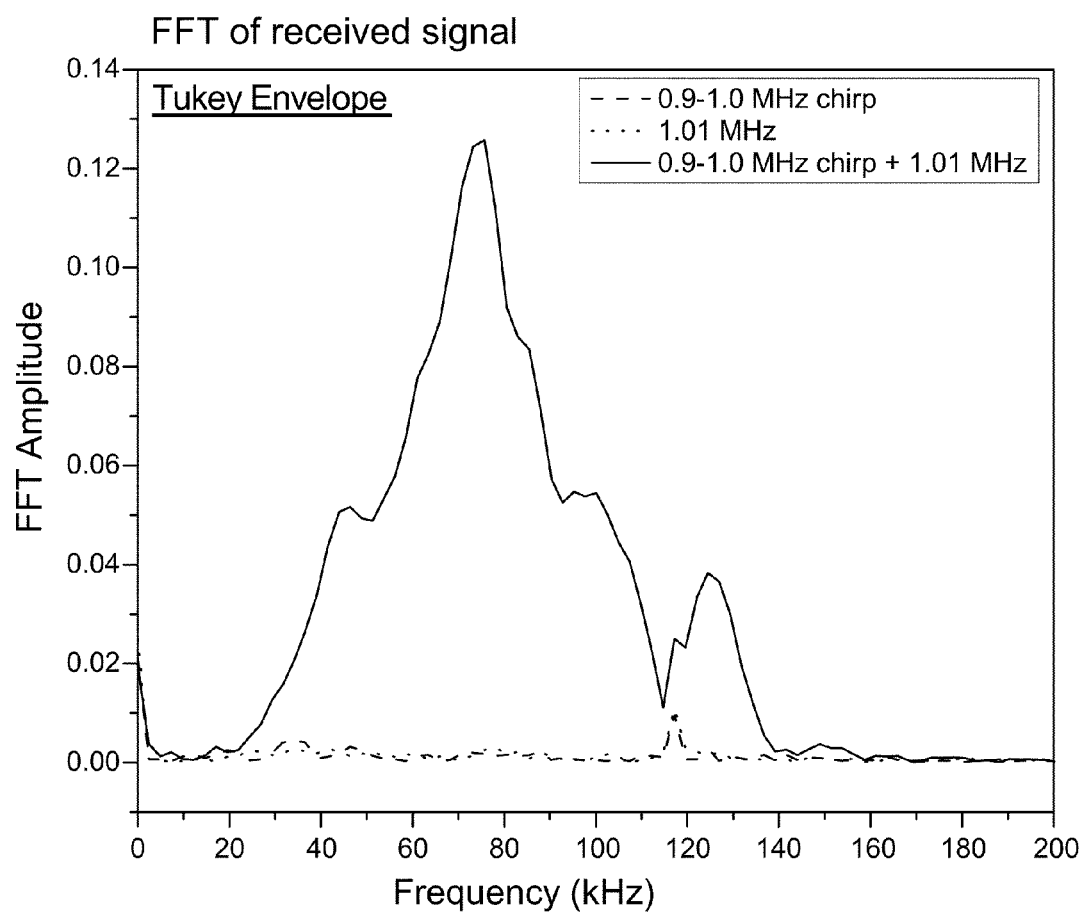

FIG. 6a shows a series of lateral scans at selected distances in the z-direction from the transmitter of the beam shown in FIG. 6b. The selected distances are 10 cm, 20 cm, 30 cm, 40 cm, 50 cm and 60 cm. The plot of amplitude as determined by voltage versus x-axis distance shows that the beam spread is small and relatively constant and independent of distance in the z-direction from the transducer. A frequency spectrum of the collimated beam is shown in FIG. 6c. The figure shows that the usable frequency range for this particular arrangement is from 20 kHz to 120 kHz. The low end of the usage frequency range can be as low as 5 kHz and is only limited by the size of the borehole. Other frequency bands may be used for the collimated beam including the acoustic logging frequencies that are typically in the kHz range and the borehole televiewer-type band that are typically in the hundreds of kHz to MHz range. One benefit of such an arrangement is that the use of a wide bandwidth chirp signal source in a borehole would tend to result in an improved signal to noise ratio in comparison with a non-chirped source. The chirped signal further may allow for an improved time-delay estimation that would be beneficial in imaging applications.

Figure 7B:
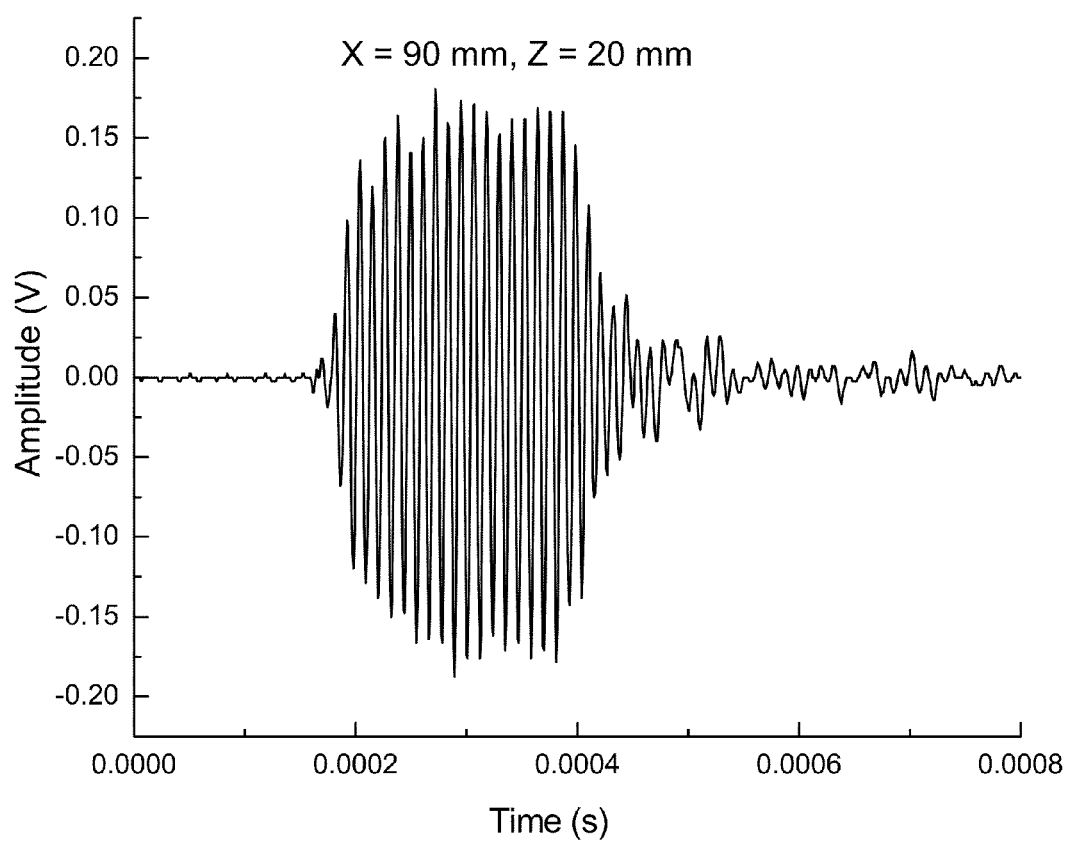
Figure 7C:
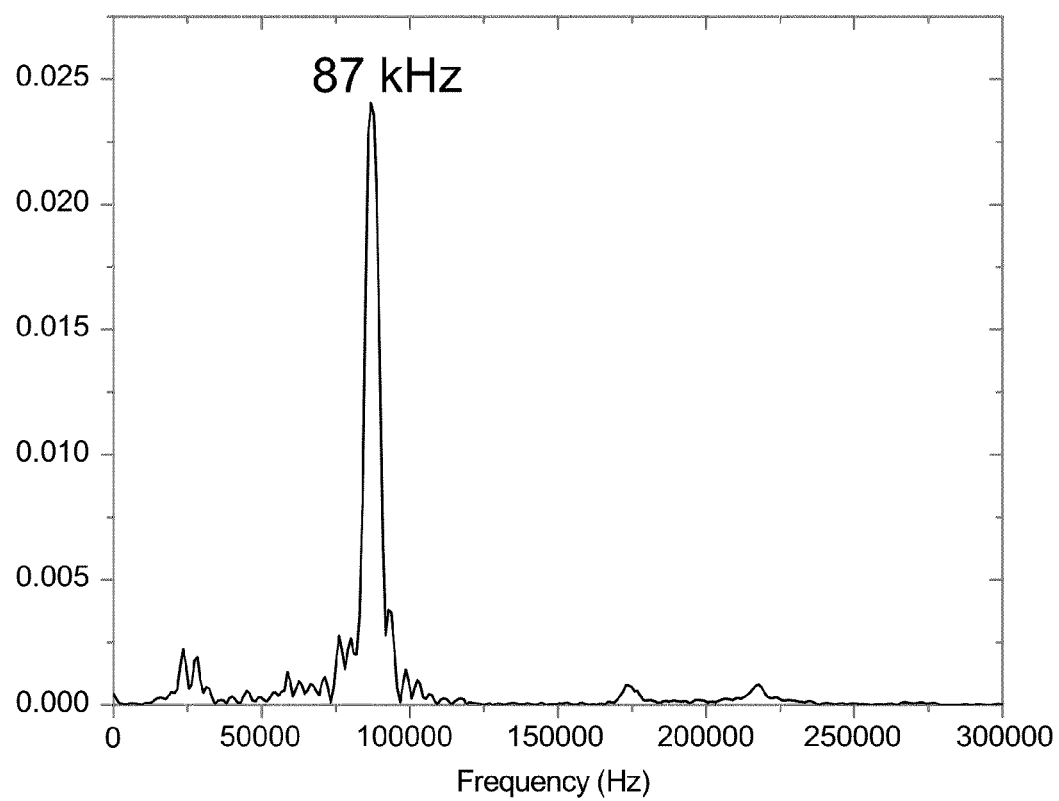

FIG. 7a shows the collimated beam produced by the mixing process using the CNC foam block as the non-linear material. A transducer array 710 is configured to produce acoustic wave at frequencies of 1.000 MHz and 1.087 MHz. The transducer array 710 is coupled to the CNC foam 720 where the two acoustic signals mix forming a collimated beam 730 having a frequency of 87 kHz. The CNC foam block has an 80 mm aperture from which the collimated beam propagated. FIG. 7b shows the amplitude of the collimated beam in the time domain at a lateral distance of 90 mm (x-axis) and an axial distance of 20 mm (z-axis). FIG. 7c shows the collimated beam in the frequency domain having a strong peak at 87 kHz.

Figure 8:
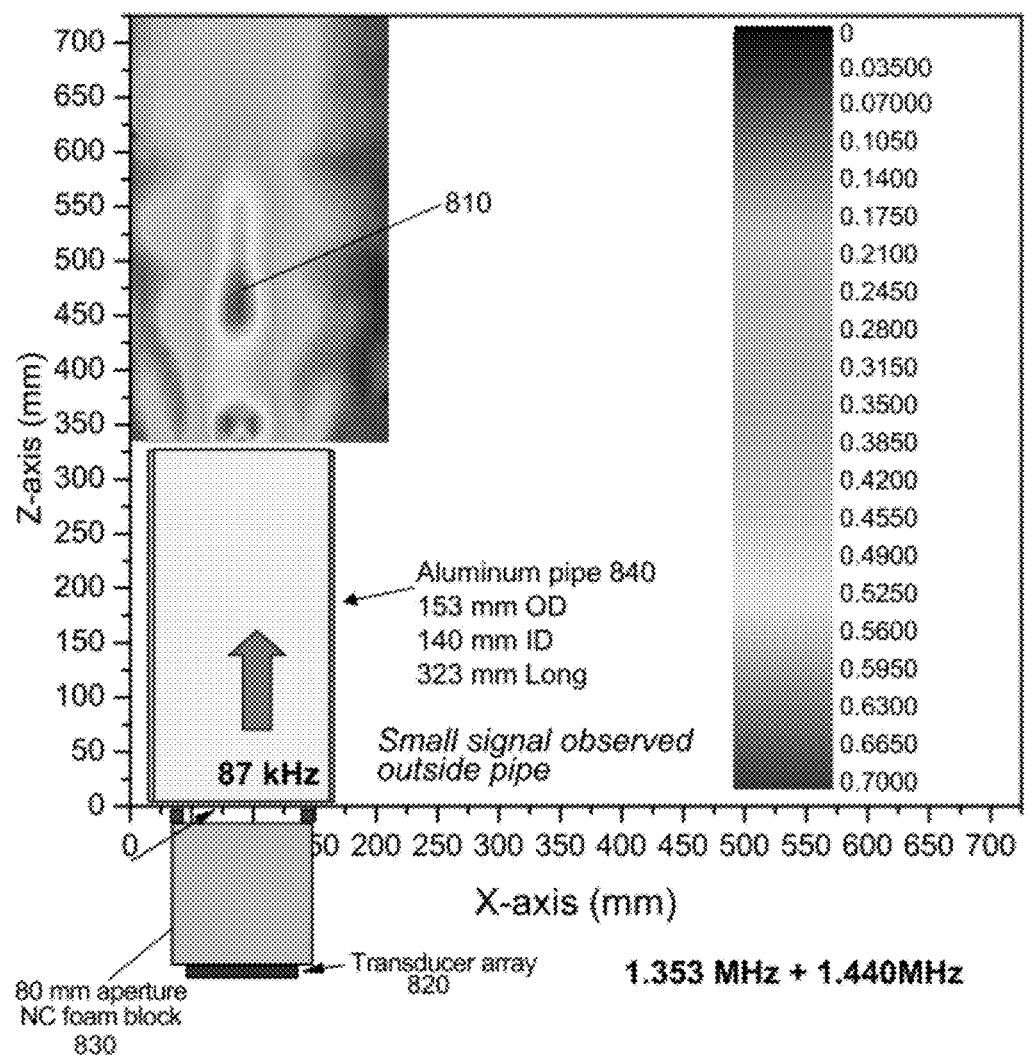
FIG. 8 shows an aspect of the invention where the collimated beam produced by the non-linear mixing process using a CNC foam block transmitted through an enclosed aluminum pipe.

FIG. 8 is similar to FIG. 7a, but shows the collimated beam 810 generated by the transducer array 820 and CNC foam block 830 arranged within an enclosure 840. As shown, the enclosure 840 is an aluminum pipe having an overall length of 323 mm, an internal diameter of 140 mm and an exterior diameter of 153 mm.

Figure 9:
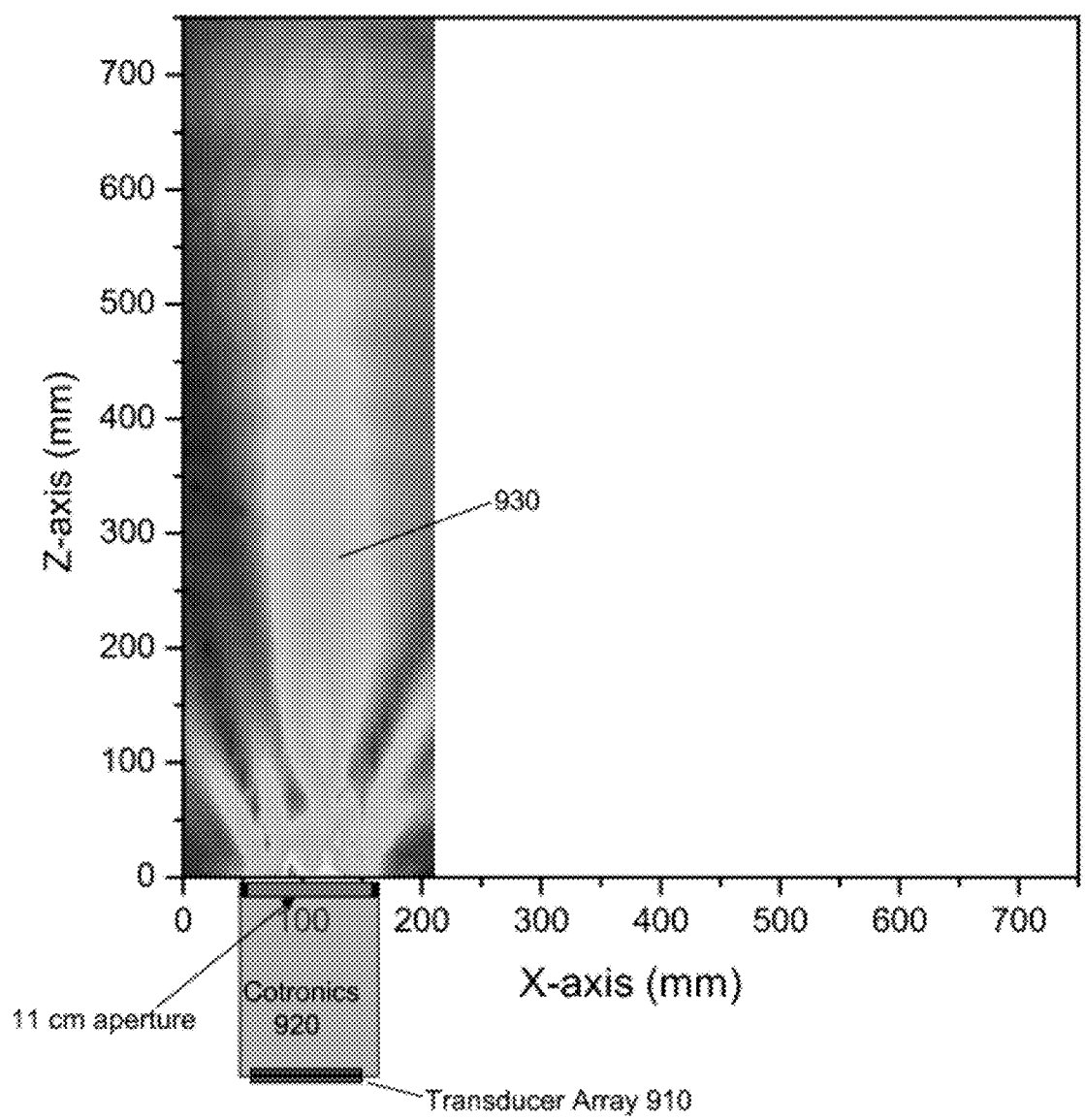
FIG. 9 shows an aspect of the invention where the collimated beam produced by the non-linear mixing process using the 310M ceramic block as the non-linear material.

FIG. 9 is similar to FIG. 7a and shows the collimated beam produced by the non-linear mixing process using the 310M ceramic block as the non-linear material. A transducer array 910 is configured to produce acoustic signals at frequencies of 1.353 MHz and 1.440 MHz. The transducer array 910 is coupled to the 310M ceramic block 920 where the two acoustic signals mix forming a collimated beam 930 having a frequency of 87 kHz. The 310M ceramic block 920 has a 110 mm aperture from which the collimated beam propagated. As can be seen in the figure, the collimated beam has side lobes that extend into the near field region at around a few centimeters from the aperture of the ceramic block; however, these side lobes do not extend into the far field region of the beam.

Figure 10:
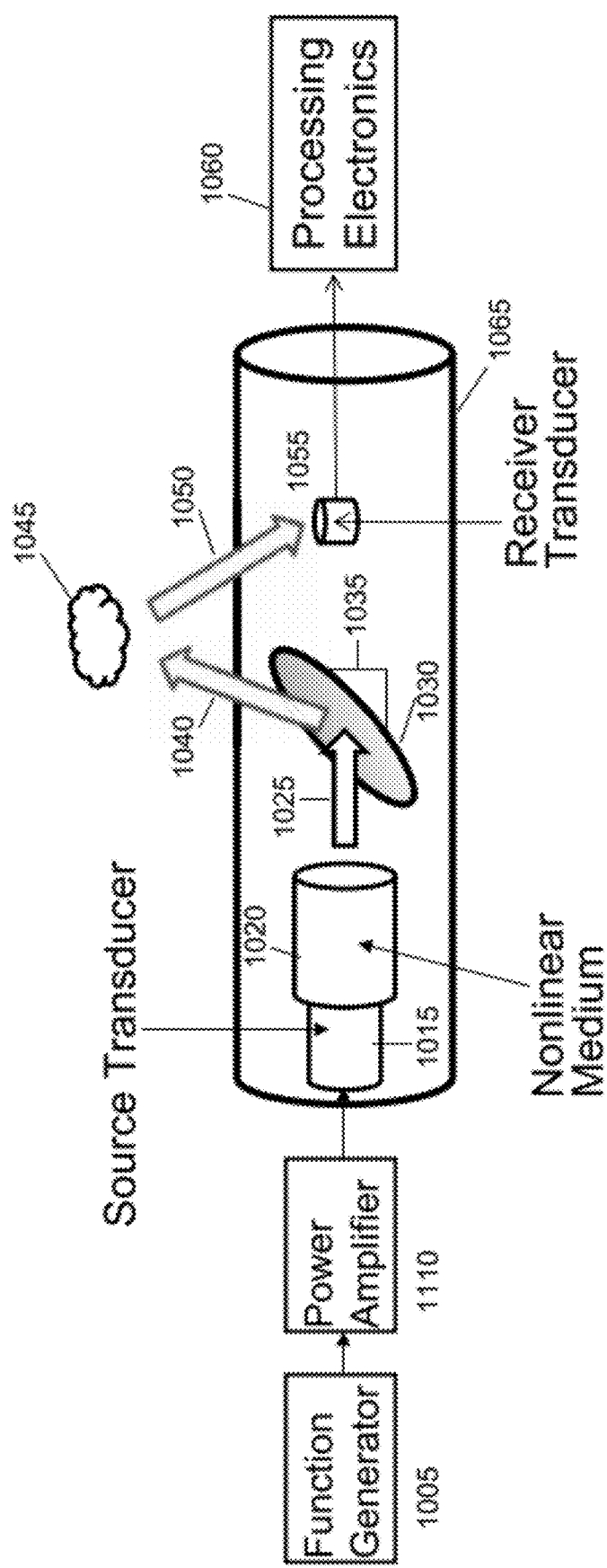
FIG. 10 shows an aspect of the invention where the device is used to characterize formations and/or materials near the borehole.

FIG. 10 shows an aspect of the invention where the device is used to characterize formations and/or materials near the borehole. One or more sources 1005 produce signals at a first and a second frequency. The signals are transmitted to a signal amplifier or amplifiers 1010 that are configured to increase the power of the signals. The signals modified by the amplifier 1010 are transmitted to one or more transducers 1015 that are configured to generate acoustic waves at the first and the second frequency. The acoustic waves are transmitted to a non-linear material 1020, which mixes the waves by way of the mixing process to produce a collimated acoustic beam 1025.

The collimated acoustic beam 1025 can be steered in a particular direction by an acoustic beam guide 1030. The acoustic beam guide 1030 can be an acoustic reflector or an acoustic lens. The acoustic reflector can be a material with different acoustic impedance from the surrounding medium in which the beam propagates. One non-limiting example of such an acoustic reflector is metal plate. The acoustic lens is configured to focus the collimated acoustic beam at a particular focal point and direction and can have a concave shape. A Fresnel-type mirror arrangement can also be used for the acoustic beam guide. The acoustic beam guide can be rotated into a particular orientation by use of one or more actuators 1035 coupled to the guide, as shown in more detail in FIG. 11. In some embodiments, the acoustic beam guide 1030 may not be used, and the collimated beam would propagate along the axis of the borehole.

The collimated beam 1040 can be reflected off the guide 1030 and steered to a particular direction toward an object of interest 1045 near the borehole. Inhomogeneities of the formations, such as object 1045 or an adjacent bed located along the beam will generate reflection or scattering of the acoustic beam. The reflected and scattered waves 1050 are received by one or more receivers 1055 in the same borehole (for the case of single well imaging) or in another borehole (for the case of cross-well imaging). The receivers 1055 can be coupled to the guide 1030, so that the receivers are configured to receive the reflected waves 1050 as the guide 1030 moves. The signals received by the receivers 1055 can be transmitted to processing electronics 1060 for analysis. The processing electronics 1060 can include a computer with appropriate software for characterizing the rock formation, including producing 2D or 3D images of the formation. The downhole instrumentation is housed in an enclosure 1065 to permit standard well logging operations.

In some aspects of the invention, the entire device including the transducers 1015, the non-linear material 1020 and receivers 1055 can be moved up and down the length of the borehole to image a particular formation near the borehole. Moreover, the entire device with or without the receivers 1055 can be rotated around the axis of the borehole to image formations in any azimuthal direction around the borehole.

Figure 11:
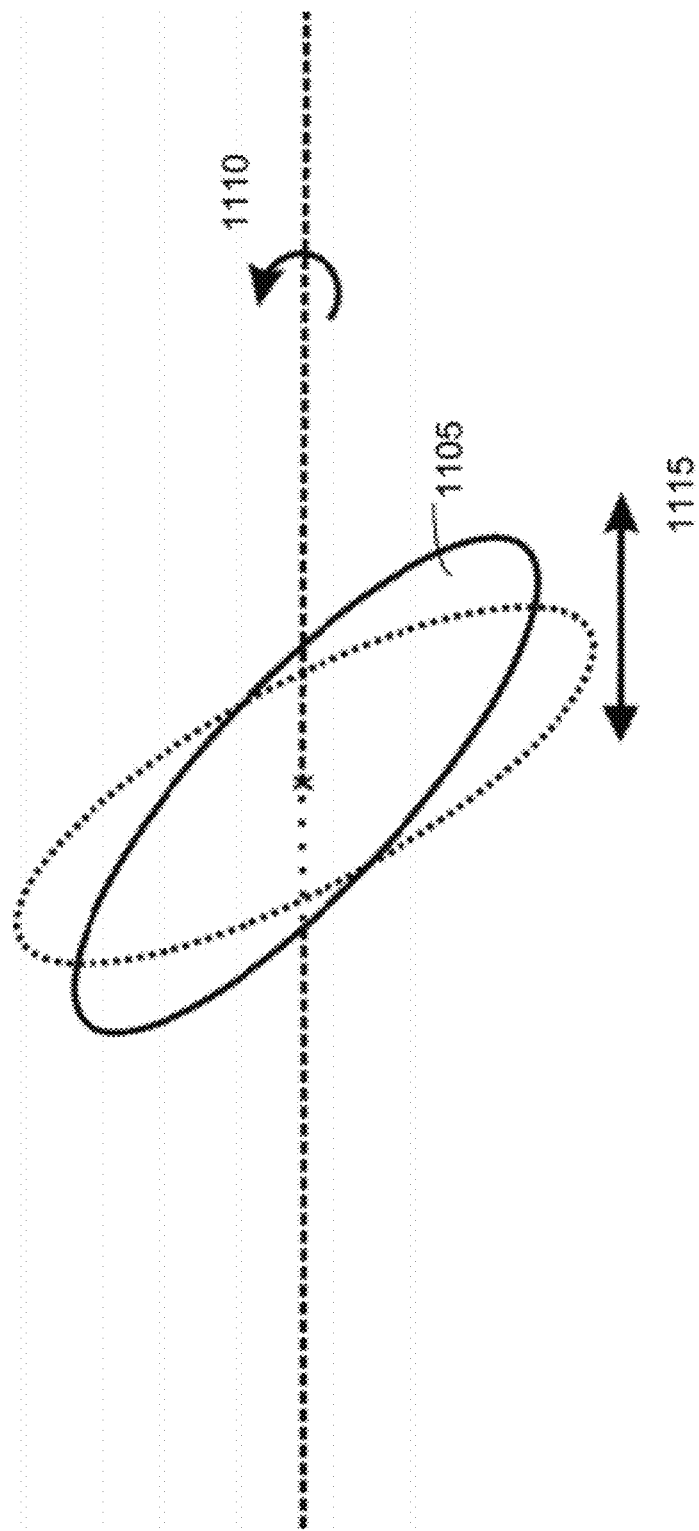
FIG. 11 shows the corresponding axes of rotation of the acoustic beam guide in accordance with an aspect of the invention.

FIG. 11 shows the corresponding axes of rotation of an acoustic beam guide 1105. The direction of the collimated beam is steered by selectively controlling the azimuth of the guide by rotation around the guide axis 1110, and the inclination 1115, the angle between the plane of the front of the guide and the guide axis. By use of actuators (not shown) the plane of the guide can be effectively controlled in azimuth and inclination. The actuators can thus be used for steering or changing the direction of the collimated beam.

Figure 12:
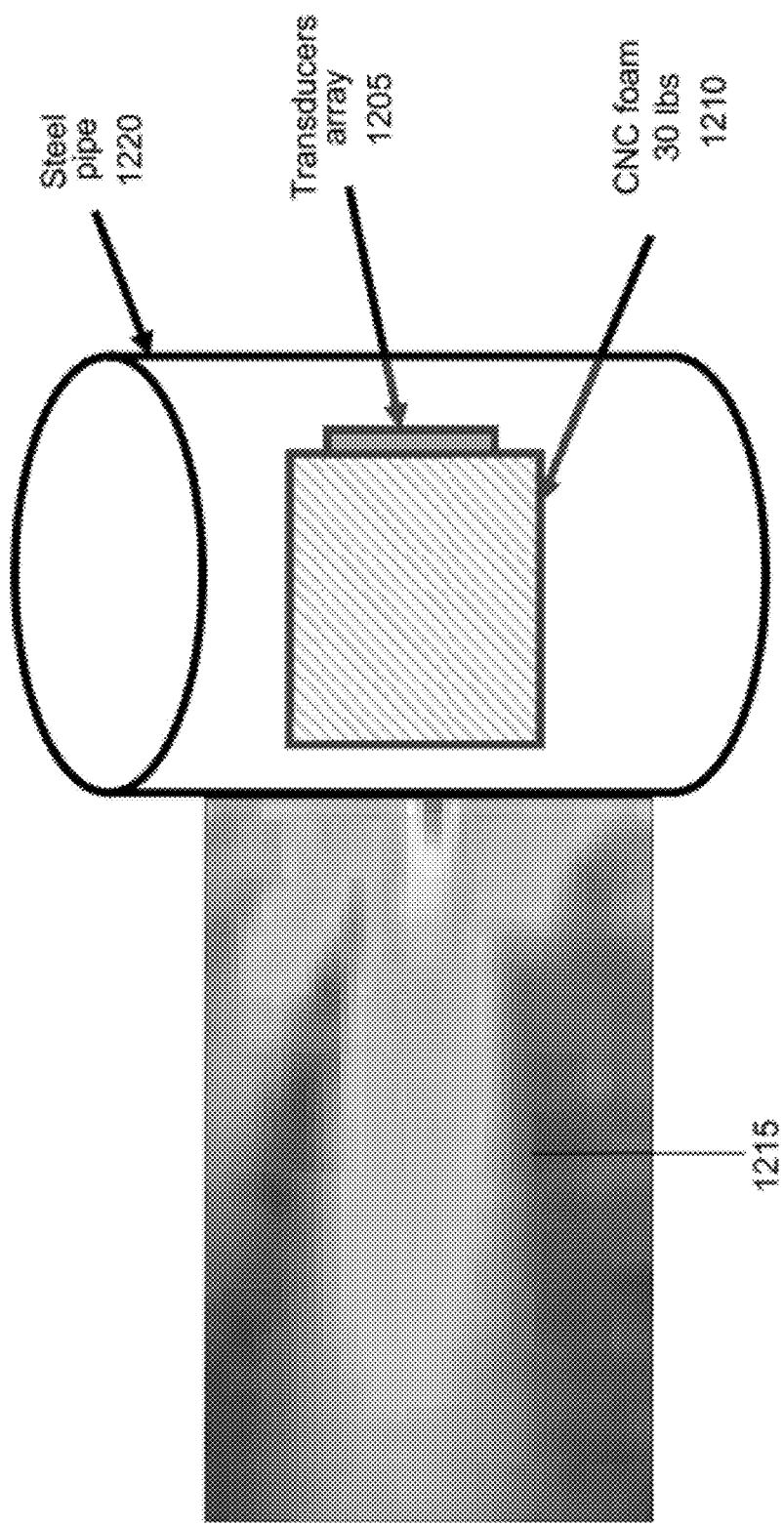
FIG. 12 shows an aspect of the invention where the collimated beam, produced by the non-linear mixing process using the 310M ceramic block as the non-linear material, penetrates a metal pipe casing.

FIG. 12 shows the collimated beam, produced by the non-linear mixing process using the 310M ceramic block as the non-linear material, penetrating a metal pipe casing. A transducer array 1205 is configured to produce acoustic signals having frequencies of 1.000 MHz and 1.087 MHz, for example. The transducer array 1205 is coupled to the 310M ceramic block 1210 where the two acoustic signals mix forming a collimated beam 1215 having a frequency of 87 kHz, which propagates through the metal pipe casing 1220. The transducer array 1205 can be rotated around the longitudinal axis of the borehole to image a formation around the borehole. The reflected or backscattered beam from the formation can be received by one or more receivers (not illustrated) in the borehole or in another borehole. The receivers can be coupled to the transducer array 1205 to rotate in a similar manner such that the reflected or backscattered beam is received by the receivers. As can be seen in the figure, the beam maintains its collimation after exiting the metal pipe casing 1220.

FIGS. 13*a* and 13*b* show the collimated beam after steering with an acoustical mirror and exiting the metal pipe casing. FIGS. 13*a* and 13*b* are similar to FIG. 12, with the difference that the non-linear material (water in this case) is producing the non-linear beam along the pipe and the beam is steered out of the pipe perpendicular to the initial propagation direction with the help of an acoustical mirror plate. A transducer array 1305 is configured to produce acoustic signals having a frequency of 0.953 MHz and 1.036 MHz, for example. The transducer array 1305 is coupled to a non-linear material (water) 1310 where the two acoustic signals mix forming a collimated beam 1315 having a frequency of 83 kHz, which reflects from the acoustical mirror 1320 and propagates through the metal pipe casing 1325. As can be seen in the figure, the beam maintains its collimation after exiting the metal pipe casing 1325, and can be easily steered by rotating the acoustical mirror in such a way that the angle of incidence of the collimated beam is changed. FIG. 13*b* shows the beam steering that results when the mirror 1320 has been rotated.

FIG. 14 shows an aspect of the invention where the device is used with an acoustic focusing system. One or more sources 1405 produce signals at a first and a second frequency. The signals are transmitted to a signal amplifier or amplifiers 1410 that are configured to increase the power of the signals. The signals modified by the amplifier 1410 are transmitted to one or more transducers 1415 that are configured to generate acoustic signals at the first and second frequencies. The acoustic signals propagate to a non-linear material 1420, which mixes the signals by way of the mixing process to produce a collimated acoustic beam 1425.

In some embodiments, the collimated acoustic beam 1425 is incident on an acoustic focusing system 1430. The collimated beam tends to have a certain beam spread, which increases as the beam propagates through the enclosure (i.e., pipe). This beam spread means that at a certain distance from the beam origin, the beam will interact with the walls of the enclosure, which tends to produce undesirable effects. The acoustic focusing system 1430 reduces this interaction of the beam and the enclosure walls by focusing the beam, and thus reducing the beam spread. The focusing need not reduce the beam profile to a point, but merely produce a well defined beam that is not distorted or attenuated due to the reflections from the walls of the enclosure, such that the beam profile does not spread too much angularly. One non-limiting example of the acoustic focusing system 1430 is a Fresnel lens made of Plexiglass or other materials that when appropriately shaped reduces the beam spread. The acoustic focusing system 1430 can include a variety of materials including a chamber filled with a liquid of different sound speed than the non-linear material in the enclosure, where the chamber is properly shaped, either convex or concave depending on the liquid sound speeds. In general, any material that is reasonably matched in acoustic impedance with that of the non-linear material in the enclosure can be used as the acoustic focusing system 1430.

In some embodiments, the acoustic focusing system 1430 is not used when the beam 1425 produced by the non-linear mixing in the material 1420 is sufficiently well-defined and does not spread too much angularly. In this case, the beam 1425 exits the material 1420 without having been further modified.

A housing or enclosure 1435 is configured to house and support the transducers 1415, the non-linear material 1420, the acoustic focusing system 1430, and one or more receivers 1440. The focused acoustic beam is directed along the axis of the housing 1435 and is reflected or scattered from an object of interest 1445. The object 1445 can include inhomogeneities in the rock formation such as invaded zones, the cement bond with casing, damaged zones, fractured zones, stratigraphic layering (particularly at high apparent dip, i.e., for high angle wells in relatively low dip formations). The receivers 1440 are configured to receive the reflected or scattered signal 1455 and the signal is processed by processing electronics 1450.

Figure 15A:
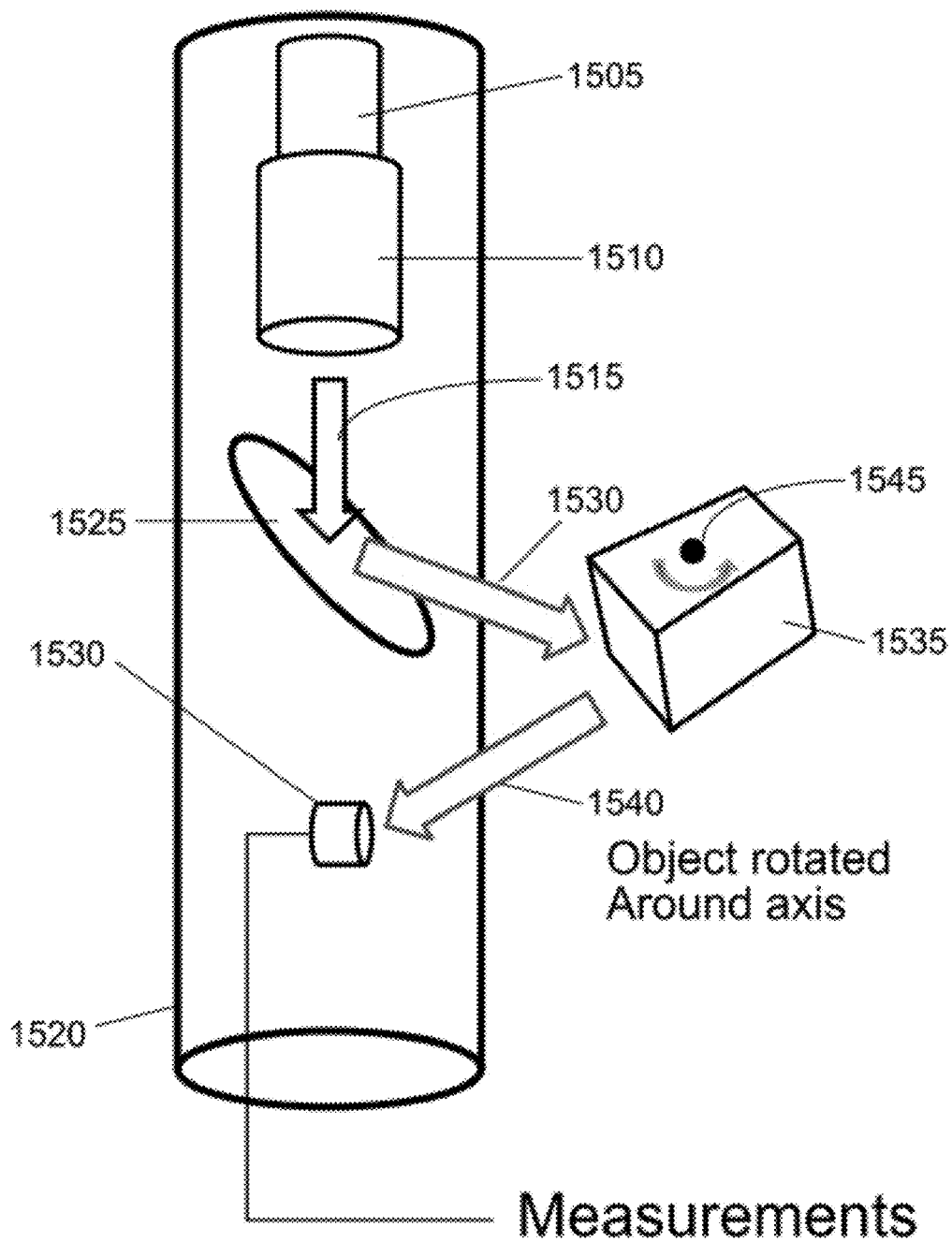
FIGS. 15a, 15b and 15c show an experimental set-up and results of the imaging of an object outside the pipe in accordance with an aspect of the invention.
Figure 15B:
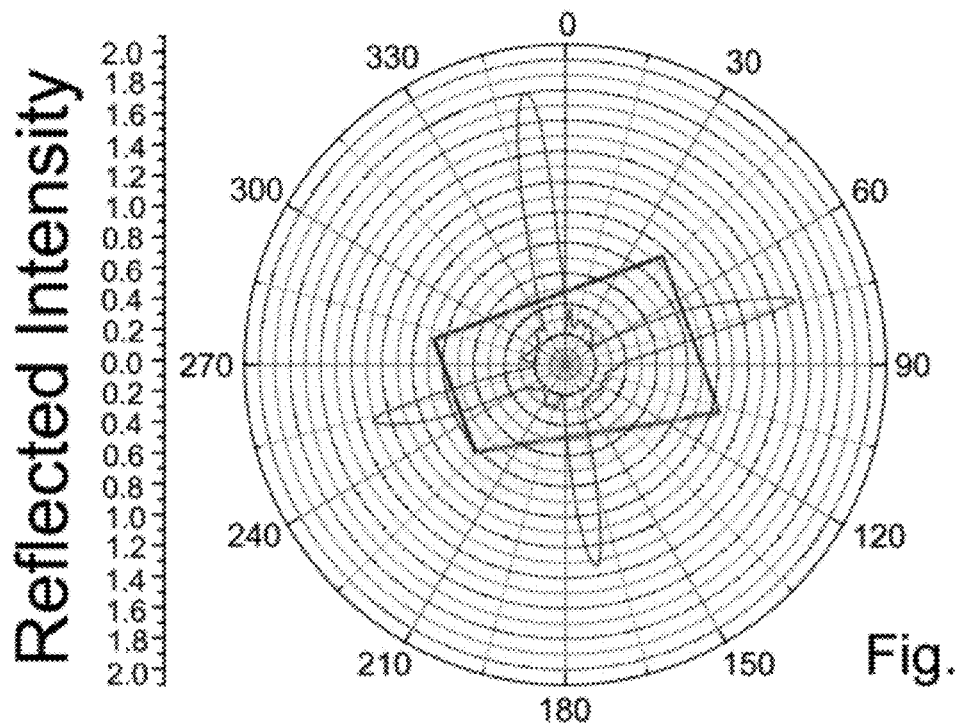
Figure 15C:
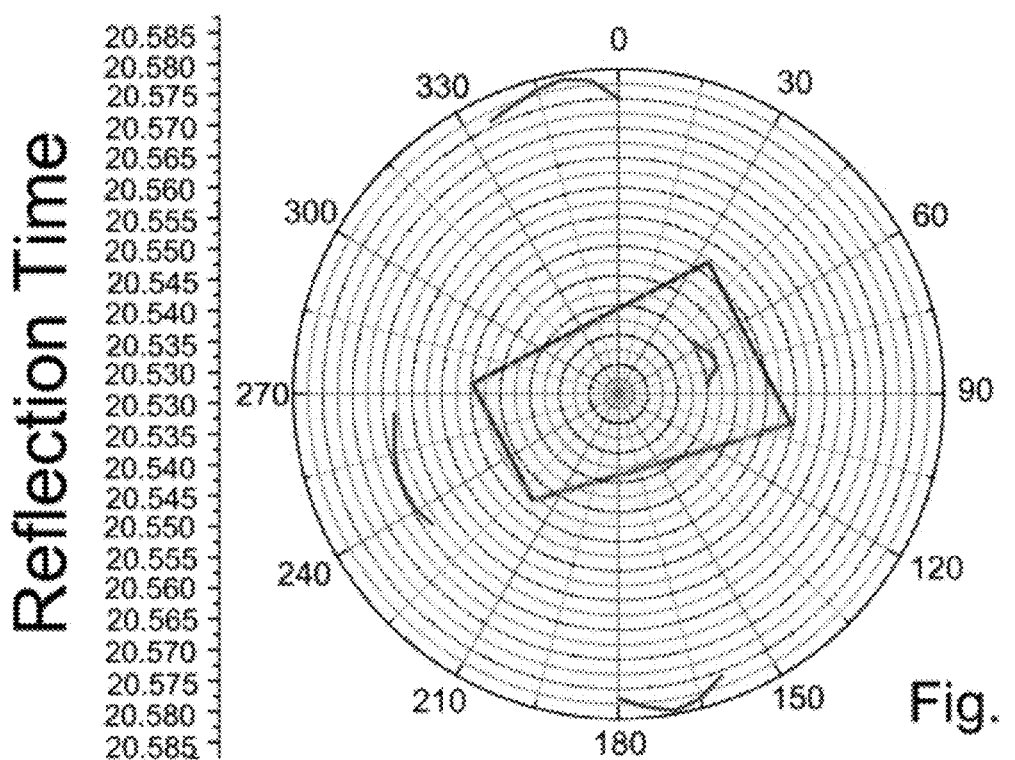

FIGS. 15*a*, 15*b* and 15*c* show an experimental set-up and results of the imaging of an object outside of the pipe in accordance with an aspect of the invention. FIG. 15*a* shows the experimental set-up that is similar in design to FIG. 10, wherein a source transducer 1505 is configured to generate acoustic signals and is coupled to a non-linear material 1510 that is configured to produce a collimated acoustic beam 1515 by a non-linear mixing process. The source transducer 1505 can be driven by a source generator and a power amplifier (both not shown). An enclosure 1520, such as a pipe, is configured to house the transducer 1505, the non-linear material 1510, as well as, an acoustic beam guide 1525, and one or more receivers 1530. The collimated acoustic beam 1515 is directed out of the enclosure 1520 by the acoustic beam guide 1525. By way of non-limiting example, in this arrangement, the acoustic beam guide 1525 is an acoustic reflector. The reflected collimated beam 1530 is incident on an object 1535 outside of the enclosure 1520. The object 1535 can include inhomogeneities in the rock formations such as invaded zones, the cement bond with casing, damaged zones, fractured zones, stratigraphic layering (particularly at high apparent dip, i.e., for high angle wells in relatively low dip formations). The collimated beam 1540 is received by the one or more receivers 1550 (either located in the same borehole or in another borehole) after is has reflected or backscattered from the object 1535.

In the experimental set-up of FIG. 15*a*, the object was rotated 360° about an axis 1545 and measurements were made of the sound intensity as recorded by receivers 1550. In this set-up, the object 1535 was a solid block of aluminum with a slightly irregular shape, placed approximately 61 cm from the pipe wall. Both the pipe and the block were immersed in water. FIG. 15*b* shows a polar plot of the measured reflected intensity and FIG. 15*c* shows a polar plot of the measured reflection time. In both FIGS. 15*b* and 15*c*, the cross-section of the aluminum block is shown for comparison with the measured data. As shown in FIG. 15*b*, there is a large signal when the face of the block is in a position maximizes the reflected signal at the receiver. Thus, each peak represents a face of the block. FIG. 15*c* shows the time-of-flight. As the block is rotated, the faces come forward and recede, changing the total distance the sound beam has to propagate. It is understood that in the borehole configuration, the intensity image will be obtained by rotation of the device. Thus the amplitude of the reflected signal represents reflections from inhomogeneities around the perimeter of the borehole.

The recordings of the received waveforms are processed to generate an image of the reflection or transmission characteristics of the formation. The propagation direction of the beam and the time-of-flight may fix the locations where scattered waves are generated, distinguishing this device from normal sonic imaging techniques using conventional non-directional monopole and dipole sources. An associated effect of using a beam compared with conventional sources is that the computation of an image of formation acoustic properties may not require a detailed specification of the rock formation's velocity field. The propagation direction of the beam and the time-of-flight measurement simplify and improve the ability to identify the location where the waves are reflected or scattered. In particular, the knowledge of the orientation of the beam exiting the tool localizes the sources of recorded scattered waves along the beam direction, and the time delay localizes the position of scattered sources along the beam path. Thus, the borehole imaging with a beam source presents a simplification and reduction in uncertainty of the final time image in contrast to conventional (not beam) sources which require an accurate detailed velocity model for computation of the 3D image. Furthermore, because the beam is focused and steerable, in azimuth and inclination with respect to the borehole, the imaging would tend to have higher resolution than obtained with a conventional (not beam) source. The method allows for detailed imaging of features including invaded zones, cement bonding with casing, damaged zones, fractured zones, stratigraphic layering particularly at high apparent dip (the angle between the plane of the bedding and the plane perpendicular to the tool axis). The broad band difference beam frequency for the invention ranges from 1 kHz to 100 kHz. The low end of this frequency range, also used by some conventional sonic logging tools, achieves a depth of penetration up to one hundred feet. It is important to note that, since the beam is broadband and can be encoded, the signal to noise ratio of the detected signal would be considerably enhanced after processing and decoding. Because of the broadband beam characteristics with greater depth of penetration and higher signal to noise ratio due to encoding, the method also allows for detailed imaging and/or characterization of non-linear properties of rock formation and its fluid contents surrounding the borehole.

The various configurations described in detail above are for the purposes of illustration only. Modifications to the configurations can be made for other applications without departing from the invention. For example, in the Logging While Drilling (LWD) and pipe conveyed configurations, using technology that allows the tool to pass through the bottom of the drill string, the compact acoustic beam generation device will enable efficient look ahead of the bit resulting in the detection of over-pressured zones or significant changes in the rheology of the formation before they are reached by the drill-bit. Steering of the beam also enables the indirect measurement of the dip and azimuth of reflecting bodies ahead of the bit. Another application is the detection of fault geometry ahead of the bit.

Although the invention has been described in detail for the purpose of illustration based on what is currently considered to be a variety of useful embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC including machine executable instructions and programmed to execute the methods, a computer array or network, or other appropriate computing device. As shown in FIGS. 10 and 14, the data collected by the receivers would undergo some processing and are either stored in memory in the tool, or transmitted up hole for further processing and storage. As a further example, it is to be understood that the present invention contemplates that, to the extent possible, one or more features of any embodiment can be combined with one or more features of any other embodiment.

What is claimed is:

1. A system for analyzing material around a borehole, the system comprising:
    a tool configured and sized to be positionable within the borehole and comprising:
        a transducer configured and arranged to generate a first acoustic wave at a first frequency and a second acoustic wave at a second frequency;
        a non-linear material arranged to receive the first and second waves, wherein, in operation, the first and second acoustic waves pass through the non-linear material and a composition of the non-linear material produces a collimated beam by mixing of the first and second acoustic waves, such that the collimated beam has a frequency equal to a difference of the frequencies of the first and the second acoustic waves, and wherein the collimated beam has a frequency of at least 20 kHz;
        a steering device arranged to controllably direct the collimated beam away from the borehole into the material around the borehole;
    one or more receivers arranged to receive the collimated beam after it has reflected or backscattered from an inhomogeneity in the material around the borehole; and
    a processor in communication with a memory having machine executable instructions stored therein which, when executed cause the processor to analyze the collimated beam after it has reflected or backscattered from an inhomogeneity in the material around the borehole to generate an image of the material.

2. The system device in accordance with claim 1, wherein the one or more receivers are located in the borehole.

3. The system in accordance with claim 1, wherein the one or more receivers are located in another borehole.

4. The system in accordance with claim 1, wherein the transducer includes a plurality of transducers arranged in an array.

5. The system in accordance with claim 1, wherein the steering device is selected from the group consisting of an acoustic reflector, an acoustic lens, and combinations thereof.

6. The system in accordance with claim 1, wherein the transducer, the acoustically non-linear medium, the steering device, and the receivers are arranged within an enclosure.

7. The system in accordance with claim 1, further comprising an encoder arranged to encode the collimated beam with a time-varying code by introducing a time varying component including one or more of chirping or frequency sweep to one of the first and the second acoustic waves, wherein the analysis comprises using the encoding to measure a time-of-flight of the collimated beam.

8. The system in accordance with claim 7, wherein the time varying components are selected from the group consisting of a variation in amplitude, a variation in frequency, a variation in phase, and combinations thereof.

9. The system in accordance with claim 1, wherein the processor in communication with the memory having instructions stored therein are arranged to analyze the collimated beam after it has reflected or backscattered from an inhomogeneity in the material around the borehole to generate an image of the material between the boreholes and to generate information to characterize linear and non-linear properties of the material and fluid contents surrounding the borehole.

10. The system in accordance with claim 1, wherein the processor in communication with the memory having instructions stored therein are arranged to analyze the collimated beam after it has reflected or backscattered from inhomogeneities in the material around the borehole to generate images selected from the group consisting' of invaded zones, cement bonding, damaged zones, fractured zones, stratigraphic layering, sources of scatter, and combinations thereof.

11. The system in accordance with claim 1, wherein the frequency range of the collimated beam is between 20 kHz and 120 kHz.

12. The system in accordance with claim 1, wherein the length of the nonlinear material is between 5 cm and 2 m.

13. The system in accordance with claim 1, wherein the first frequency has a range of frequencies.

14. The system in accordance with claim 1, wherein the second frequency has a range of frequencies.

15. The system in accordance with claim 1, wherein the material around the borehole is rock formation, cement, or casing, or combinations thereof.

16. The system in accordance with claim 1, wherein the non-linear material is selected from the group consisting of: a mixture of liquids, a solid, a granular material, embedded microspheres, an emulsion, and combinations thereof.

17. A system for analyzing material around a borehole, the system comprising:
an array of transducers configured and sized to be positionable within the borehole and arranged to generate a first acoustic wave at a first frequency and a second acoustic wave at a second frequency;
a non-linear material arranged to receive the first and second waves, wherein, in operation, the first and second acoustic waves pass through the non-linear material and a composition of the non-linear material produces a collimated beam by mixing of the first and second acoustic waves, such that the collimated beam has a frequency equal to a difference of the frequencies of the first and second acoustic waves, wherein the collimated beam has a frequency of at least 20 kHz;
a steering device arranged to controllably direct the collimated beam in at least two directions into the material around the borehole, wherein the at least two directions include an azimuthal direction around a longitudinal axis of the borehole and an inclination with respect to the longitudinal axis of the borehole;
one or more receivers arranged to receive the collimated beam after it has reflected or backscattered from an inhomogeneity in the material around the borehole; and
a processor in communication with a memory having machine executable instructions stored therein which, when executed cause the processor to analyze the collimated beam after it has reflected or backscattered from an inhomogeneity in the material around the borehole to generate an image of the material.

18. The system in accordance with claim 17, wherein the frequency range of the collimated beam is between 20 kHz and 120 kHz.

19. The system in accordance with claim 17, wherein the length of the nonlinear material is between 5 cm and 2 m.

20. The system in accordance with claim 17, wherein the non-linear material is selected from the group consisting of: a mixture of liquids, a solid, a granular material, embedded microspheres, an emulsion, and combinations thereof.

21. The system in accordance with claim 17, wherein the non-linear material includes a foam material.

22. The system in accordance with claim 17, wherein the non-linear material includes a ceramic material.

23. The system in accordance with claim 17, wherein the array of transducers and the non-linear material are arranged within a housing.

24. The system in accordance with claim 23, wherein the housing includes metal.

* * * * *